US012771517B2

(12) United States Patent
Lou et al.

(10) Patent No.: US 12,771,517 B2
(45) Date of Patent: Oct. 20, 2026

(54) ENABLING ENHANCED SUBCHANNEL SELECTIVE TRANSMISSION IN WLAN SYSTEMS

(71) Applicant: InterDigital Patent Holdings, Inc., Wilmington, DE (US)

(72) Inventors: Hanqing Lou, Syosset, NY (US); Zinan Lin, Basking Ridge, NJ (US); Mahmoud Saad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 382 days.

(21) Appl. No.: 18/573,765

(22) PCT Filed: Jun. 24, 2022

(86) PCT No.: PCT/US2022/034889
§ 371 (c)(1),
(2) Date: Dec. 22, 2023

(87) PCT Pub. No.: WO2022/272052
PCT Pub. Date: Dec. 29, 2022

(65) Prior Publication Data
US 2024/0333465 A1 Oct. 3, 2024

Related U.S. Application Data

(60) Provisional application No. 63/337,718, filed on May 3, 2022, provisional application No. 63/215,167, filed on Jun. 25, 2021.

(51) Int. Cl.
*H04L 5/00* (2006.01)
*H04W 84/12* (2009.01)

(52) U.S. Cl.
CPC .......... *H04L 5/0094* (2013.01); *H04L 5/0037* (2013.01); *H04L 5/0055* (2013.01); *H04W 84/12* (2013.01)

(58) Field of Classification Search
CPC ... H04L 5/0094; H04L 5/0037; H04L 5/0055; H04L 1/16; H04L 5/0057; H04L 5/0053;
(Continued)

(56) References Cited

U.S. PATENT DOCUMENTS

2012/0213305 A1 8/2012 Oh et al.
2016/0100396 A1* 4/2016 Seok ...................... H04L 5/003 370/329
(Continued)

FOREIGN PATENT DOCUMENTS

JP 2013522950 A 6/2013
JP 2016521515 A 7/2016
(Continued)

OTHER PUBLICATIONS

Yongho Seok, (Mediatek): "1b238-cr-he-subchannel-selective-transmission", IEEE Draft 11-19-0771-00-00AX-LB238-CR-HE-Subchannelselective-Transmission, IEEE-SA Mentor, Piscataway, NJ USA vol. 802.11ax, Jul. 13, 2019, pp. 1-8.
(Continued)

*Primary Examiner* — Nimesh Patel
(74) *Attorney, Agent, or Firm* — Flaster Greenberg P.C.

(57) ABSTRACT

Methods and apparatuses for Subchannel Selective Transmission (SST) in a Wireless Local Area Network (WLAN) are provided herein. A station (STA) may receive a trigger frame from an access point (AP). The trigger frame may indicate a range of association identifiers (AIDs) and/or subchannel information. The subchannel information may identify one or more secondary subchannels for an SST. The STA may determine that the AID of the STA is within the range of AIDs indicted in the trigger frame. The STA may send feedback to the AP that indicates that the STA will monitor one or more of the secondary subchannels. The STA may receive the SST from the AP on a secondary subchannel
(Continued)

of the one or more secondary subchannels. The STA may send an acknowledgment (ACK) to the AP on the secondary subchannel in response to receipt of the SST.

20 Claims, 33 Drawing Sheets

(58) Field of Classification Search
CPC ... H04L 5/0048; H04L 5/0044; H04L 1/0026; H04L 5/0007; H04L 5/0023; H04L 1/1861; H04L 5/0039; H04L 1/1854; H04L 1/0027; H04L 5/0035; H04L 5/1469; H04L 25/0204; H04L 25/0226; H04L 27/2666; H04L 5/0012; H04L 27/2613; H04L 27/2602; H04L 41/0894; H04L 12/1407; H04L 1/1887; H04L 27/261; H04L 41/16; H04L 5/0016; H04L 5/0005; H04L 47/20; H04L 5/003; H04L 67/61; H04L 47/805; H04L 25/0222; H04L 25/0224; H04L 1/1628; H04L 27/2601; H04L 5/0078; H04L 5/0073; H04W 84/12; H04W 72/0453; H04W 72/23; H04W 72/0446; H04W 72/1268; H04W 24/10; H04W 74/0816; H04W 28/26; H04W 74/006; H04W 72/12; H04W 72/541; H04W 72/04; H04W 28/0289; H04W 74/004; H04W 72/563; H04W 72/21; H04W 92/18; H04W 72/25; H04W 72/20; H04W 52/0216; H04W 4/70; H04W 24/02; H04W 4/08; H04W 88/06; H04W 72/542; H04W 36/0061; H04W 72/40; H04W 72/56; H04W 28/0236; H04W 52/146; H04W 52/242; H04W 74/06; H04W 48/12; H04W 52/0258; H04W 52/0245; H04W 72/51; H04W 72/0473; H04W 72/046; H04W 16/18; H04W 16/28; H04W 28/06; H04B 7/0452; H04B 7/0626; H04B 7/0617; H04B 7/0689; H04B 7/088; H04B 7/0695; H04B 7/06952; H04B 17/328; H04B 7/0619; H04B 7/0413; H04B 17/336; H04B 7/0632; H04B 7/06954; H04B 7/0874; H04B 7/0417; H04B 7/061; H04B 7/0691; H04B 7/2612; H04B 7/185; H04B 7/18513; H04B 17/318; H04B 7/005; H04B 7/0408; H04B 7/2606; H04B 7/2621; H04B 17/18; H04B 17/21; H04B 17/254; H04B 17/40; H04B 7/0636; H04B 7/0643; H04B 7/0641; H04B 7/066; H04B 7/0665; H04B 7/068; H04B 7/06966; Y02D 30/70; G06N 20/00; G06N 3/00; H04M 15/66; H04M 15/8016; H04M 15/58; H04M 15/8214; H04M 15/61; H04M 3/56; H04M 2203/2044; H04M 2207/18; H04M 1/72421; H04M 15/65; H04M 15/8077; G01S 5/0236; G01S 7/415; G01S 1/0428; G01S 13/04; G01S 13/56; G01S 5/0054; G01S 5/02; G01S 2013/462; G01S 2205/008; H04J 1/16; H04J 2211/005; H04J 11/0023
See application file for complete search history.

(56) References Cited

U.S. PATENT DOCUMENTS

| | | | | |
|---|---|---|---|---|
| 2016/0119902 | A1 | 4/2016 | Cheong et al. | |
| 2016/0242195 | A1 | 8/2016 | Kwon et al. | |
| 2017/0273019 | A1* | 9/2017 | Park | H04W 74/06 |
| 2019/0007973 | A1* | 1/2019 | Lou | H04W 74/006 |
| 2019/0215884 | A1* | 7/2019 | Patil | H04W 74/004 |
| 2019/0229862 | A1* | 7/2019 | Kim | H04L 5/0007 |
| 2020/0092881 | A1 | 3/2020 | Nezou et al. | |

FOREIGN PATENT DOCUMENTS

| | | | |
|---|---|---|---|
| JP | 2020518154 | A | 6/2020 |
| WO | WO 2018/132261 | A1 | 7/2018 |
| WO | 2021001316 | A1 | 1/2021 |

OTHER PUBLICATIONS

IEEE Std 802.11™-2016: Wireless LAN Medium Access Control (MAC) and Physical Layer (PHY) Specifications.

IEEE P802.11ax™/D8.0: Wireless LAN Medium Access Control (MAC) and Physical Layer (PHY) Specifications.

IEEE P802.11be™/D1.0: Wireless LAN Medium Access Control (MAC) and Physical Layer (PHY) Specifications, May 2021.

* cited by examiner

100

500

| Trigger Type Subfield value | Trigger frame variant |
|---|---|
| 0 | Basic |
| 1 | BF Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

FIG. 5

600

| | STARTING AID | RESERVED | FEEDBACK TYPE | RESERVED | UL TARGET RECEIVE POWER | MULTIPLEXING FLAG |
|---|---|---|---|---|---|---|
| BITS: | 12 | 9 | 4 | 7 | 7 | 1 |

FIG. 6

1200

| Common Info field B54 | Common Info field B55 | User Info field B39 | Presence of Special User Info field | User Info field variant | TB PPDU type |
|---|---|---|---|---|---|
| 1 | 1 | 0 | No | HE variant | HE |
| 0 | 0 | 0 | Yes | EHT variant | EHT |
| 0 | 0 | 1 | Yes | EHT variant | EHT |
| 1 | 0 | 1 | Yes | EHT variant | EHT |
| 1 | 0 | 0 | Yes | HE variant | HE |

FIG. 12

1300

| Value of the EHT-SIG MCS field | EHT-MCS index | Modulation | $R$ | $N_{BPSCS}$ | $N_{SD}$ | $N_{CBPS}$ | $N_{DBPS}$ | EHT-SIG rate (Mb/s) |
|---|---|---|---|---|---|---|---|---|
| 0 | EHT-MCS 0 | BPSK | 1/2 | 1 | 52 | 52 | 26 | 6.6 |
| 1 | EHT-MCS 1 | QPSK | 1/2 | 2 | 52 | 104 | 52 | 13.2 |
| 2 | EHT-MCS 3 | 16-QAM | 1/2 | 4 | 52 | 208 | 104 | 26.0 |
| 3 | EHT-MCS 15 | BPSK-DCM | 1/2 | 1 | 26 | 26 | 13 | 3.3 |
| NOTE—The parameters $N_{SD}$, $N_{CBPS}$, and $N_{DBPS}$ are used for the EHT-SIG field transmission in each 20 MHz subchannel. | | | | | | | | |

FIG. 13

1600

| Value | Description |
| --- | --- |
| 0 | Resource Request |
| 1 | SST Request |
| other values | Reserved |

FIG. 16

1800

| Control ID value | Meaning | Length of the Control Information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7 | EHT Operating Mode (EHT OM) | 6 |
| 8 | EHT SST Control | V |
| 9-14 | Reserved | |
| 15 | Ones need expansion surely (ONES) | 26 |

FIG. 18

2500

2510 2520 2530 2540 2550

| Operating channel width of the beamformee (MHz) | Bandwidth of the NDP Announcement frame (MHz) | AP operating channel width (MHz) | Feedback RU/MRT size | Partial BW Info subfield values B0B1B2B3B4B5B6B7B8 |
|---|---|---|---|---|
| 20 | 20 | 40 | 242 | 000001000 |
| 20, 40 | 40 | 80 | 484 | 000001100 |
| | | | 242 | 000001000 |
| 20,40,80 | 80 | 160 | 969 | 000001111 |
| | | | 484 | 000001100,000000011 |
| | | | 484+242 | 000001110, 000001101, 000001011,000000111 |
| | | | 242 | 000001000, 000000100, 000000010, 000000001 |
| 80, 160 | 160 | 320 | 2x996 | 100001111 |
| | | | 996+484 | 100001110, 100001101, 100001011, 100000111 |
| | | | 996 | 100001100, 100000011 |
| | | | 484 | 100001000, 100000100, 100000010, 100000001 |

FIG. 25

2600

| | | | | |
|---|---|---|---|---|
| P80 | HE | EHT | HE | EHT |
| S80 | HE | EHT | EHT | HE |
| T80 | EHT | EHT | EHT | EHT |
| F80 | EHT | EHT | EHT | EHT |

FIG. 26

2700

| Common Info B54 (HE/EHT P160) | Common Info B55 (Special User Present) | Subchannel | TB PPDU type |
|---|---|---|---|
| 1 | 1 | Primary 160MHz | HE (legacy) |
| 1 | 0 | P160 HE, S160 EHT | A-PPDU |
| 0 | 0 | P160 EHT, S160 EHT | EHT |
| 0 | 1 | P80 HE, S240 EHT | A-PPDU |

2710 2720 2730 2740

FIG. 27

2800

| Common Info B54 (HE/EHT P160) (2810) | Common Info B55 (Special User Present) (2820) | New subfield (A-PPDU 80) (2825) | Subchannel (2830) | TB PPDU type (2840) |
|---|---|---|---|---|
| 1 | 1 | 0 | Primary 160MHz | HE (legacy) |
| 1 | 0 | 0 | P160 HE, S160 EHT | A-PPDU |
| 0 | 0 | 0 | P160 EHT, S160 EHT | EHT |
| 0 | 0 | 1 | P80 HE, S240 EHT | A-PPDU |
| 0 | 1 | 0/1 | Not valid | Not valid |

FIG. 28

2900

| Common Info B54 (HE/EHT P160) (2910) | Common Info B55 (Special User Present) (2920) | New subfield (A-PPDU 80) (2925) | Subchannel (2930) | TB PPDU type (2940) |
|---|---|---|---|---|
| 1 | 1 | 0 | Primary 160MHz | HE (legacy) |
| 1 | 0 | 0 | P160 HE, S160 EHT | A-PPDU |
| 0 | 0 | 0 | P160 EHT, S160 EHT | EHT |
| 0 | 0 | 1 | P80 HE, S240 EHT | A-PPDU |
| 0 | 1 | 1 | P80 ETH, S80 HE, S160 EHT | A-PPDU |
| 0 | 1 | 0 | reserved | reserved |

FIG. 29

3000

3010 3020 3030 3040 3050

| Operating channel width of the beamformee (MHz) | Bandwith of the NDP Announcement frame (MHz) | AP operating channel width (MHz) | Feedback RU/MRT size | Partial BW Info subfield values |
|---|---|---|---|---|
| 80, 160 | 160 | 320 | 2 x 996 | 011111111 |
| | | | 996+484 | 011111100, 011110011, 011001111, 000111111 |
| | | | 996 | 011110000, 000001111 |
| | | | 484 | 011000000, 000110000,000001100, 000000011 |

FIG. 30

ENABLING ENHANCED SUBCHANNEL SELECTIVE TRANSMISSION IN WLAN SYSTEMS

CROSS-REFERENCE TO RELATED APPLICATIONS

This application is the 371 National Stage of International Application No. PCT/US2022/034889, filed Jun. 24, 2022, which claims priority to U.S. provisional patent application No. 63/215,167, filed Jun. 25, 2021, and U.S. provisional patent application No. 63/337,718, filed May 3, 2022, each of which are incorporated herein by reference in their entirety.

BACKGROUND

A WLAN in Infrastructure Basic Service Set (BSS) mode may have an Access Point (AP) for the BSS and one or more stations (STAs) associated with the AP. The AP may have access to or interface with a Distribution System (DS) or another type of wired/wireless network that carries traffic in and out of the BSS. Traffic to STAs that originates from outside the BSS may arrive through the AP and be delivered to the STAs. Traffic originating from STAs to destinations outside the BSS may be sent to the AP to be delivered to the respective destinations. Traffic between STAs within the BSS may also be sent through the AP where the source STA may send traffic to the AP and the AP may deliver the traffic to the destination STA.

SUMMARY

Methods and apparatuses for Subchannel Selective Transmission (SST) in a Wireless Local Area Network (WLAN) are provided herein. A method may include receiving a trigger frame from an 802.11 Access Point (AP), wherein the trigger frame includes at least a field indicating a range of Association Identifiers (AIDs) associated with a plurality of 802.11 Stations (STAs) and a field assigning one or more channels for transmitting a response to the trigger frame. The method may further include determining, based on the field indicating the range of AIDs, whether to transmit a response to the trigger frame. The method may further include monitoring at least one of the one or more channels before transmitting a response to the trigger frame. The method may further include sending, to the AP, an indication that SST is supported.

A STA may receive a trigger frame from an AP. The trigger frame may indicate a range of association identifiers (AIDs) and/or subchannel information. The subchannel information may identify one or more secondary subchannels for an SST. The STA may determine that the AID of the STA is within the range of AIDs indicted in the trigger frame. The STA may send feedback to the AP that indicates that the STA will monitor one or more of the secondary subchannels. The STA may receive the SST from the AP on a secondary subchannel of the one or more secondary subchannels. The STA may send an acknowledgment (ACK) to the AP on the secondary subchannel in response to receipt of the SST.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 5 is a table depicting an example of a Trigger Type subfield in the Common Info Field;

FIG. 6 is a table depicting an example of a User Info field format of an NFRP Trigger frame in accordance with 802.11ax;

FIG. 12 is an example of valid combinations of several bits with corresponding solicited trigger based (TB) physical protocol data unit (PPDU) format;

FIG. 13 illustrates example modulation and coding schemes (MCSs) for EHT-SIG symbols;

FIG. 16 illustrates an example encoding of an Exemplary Feedback Type subfield;

FIG. 18 is a table illustrating exemplary Control identifier (ID) subfield values including an SST Control subfield;

FIG. 25 is a table illustrating settings for BW and Partial BW Info subfields in the NDP Announcement frame for SST STAs Operating on Secondary Channels;

FIG. 26 is a table illustrating possible A-PPDU cases with 80 megahertz (MHz) resolution;

FIG. 27 is a table illustrating the use of B54 and B55 in a Common Info field to signal A-PPDU cases;

FIG. 28 is a table illustrating the use of B54 and B55 in the Common Info field and a newly defined subfield to signal A-PPDU cases;

FIG. 29 is a table illustrating the use of B54 and B55 in the Common Info field and a newly defined subfield to signal A-PPDU cases; and FIG. 30 is a table illustrating settings for BW and Partial BW Info subfields in the NDP Announcement frame for SST STAs Operating on Secondary Channels.

DETAILED DESCRIPTION

Figure 1A:
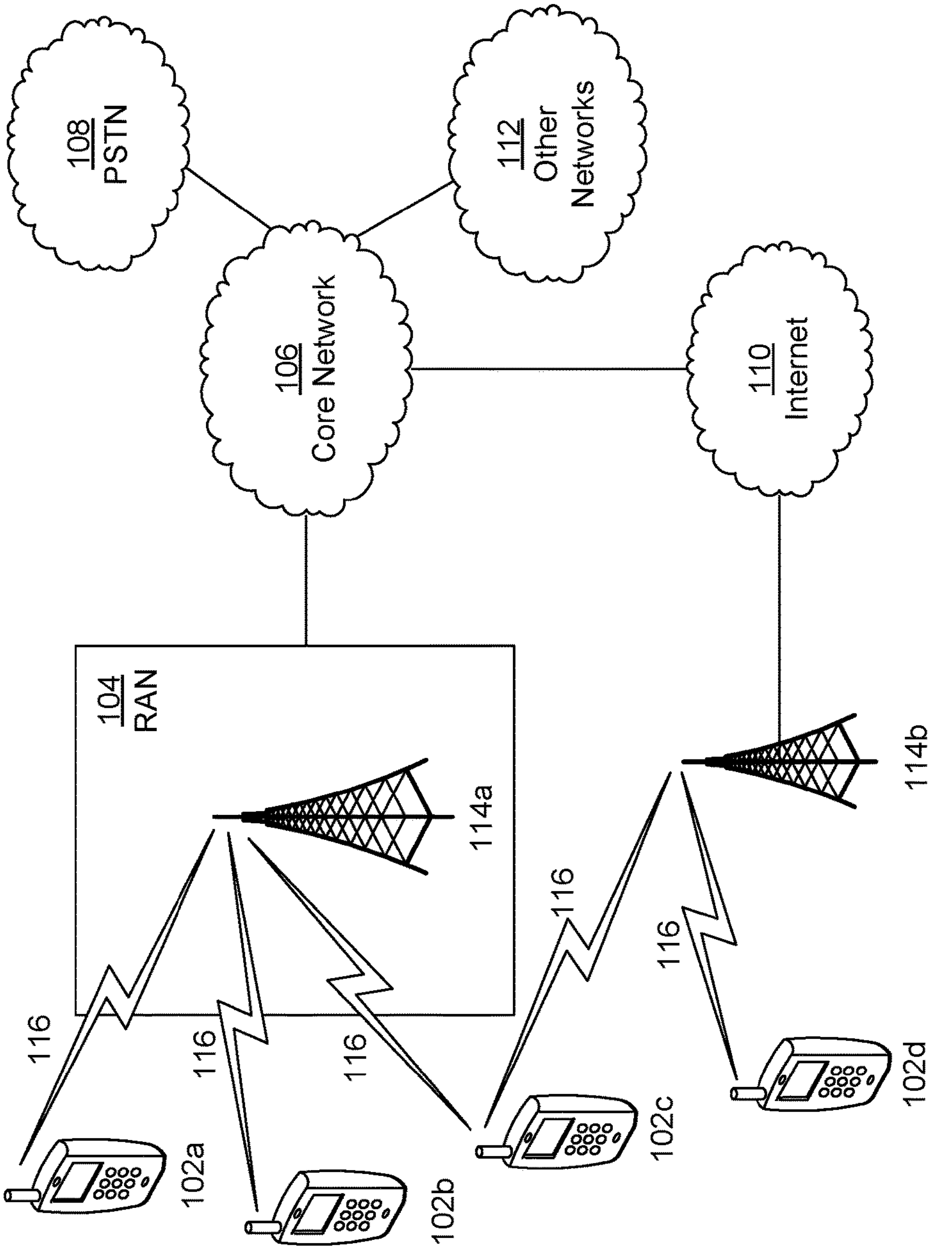
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
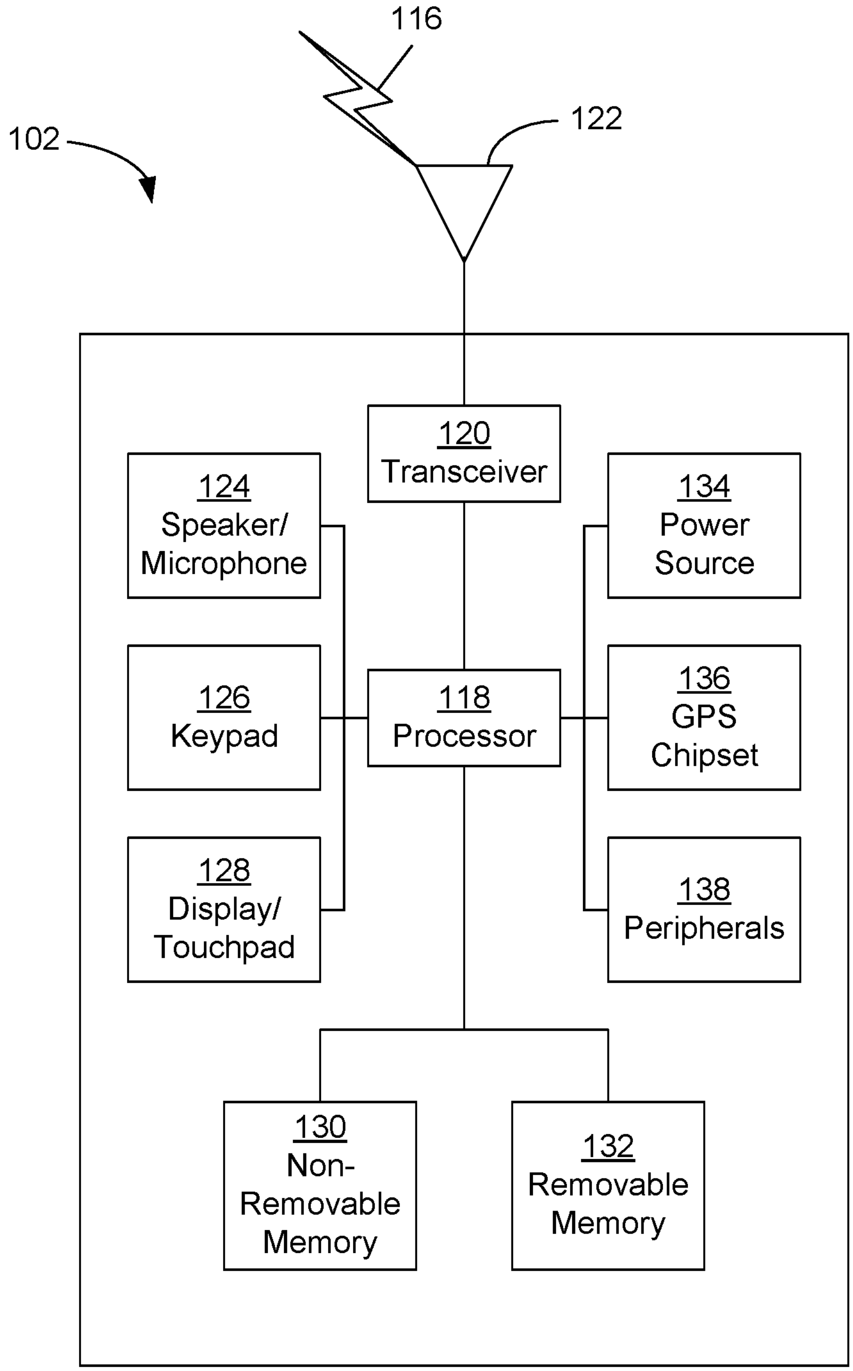
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
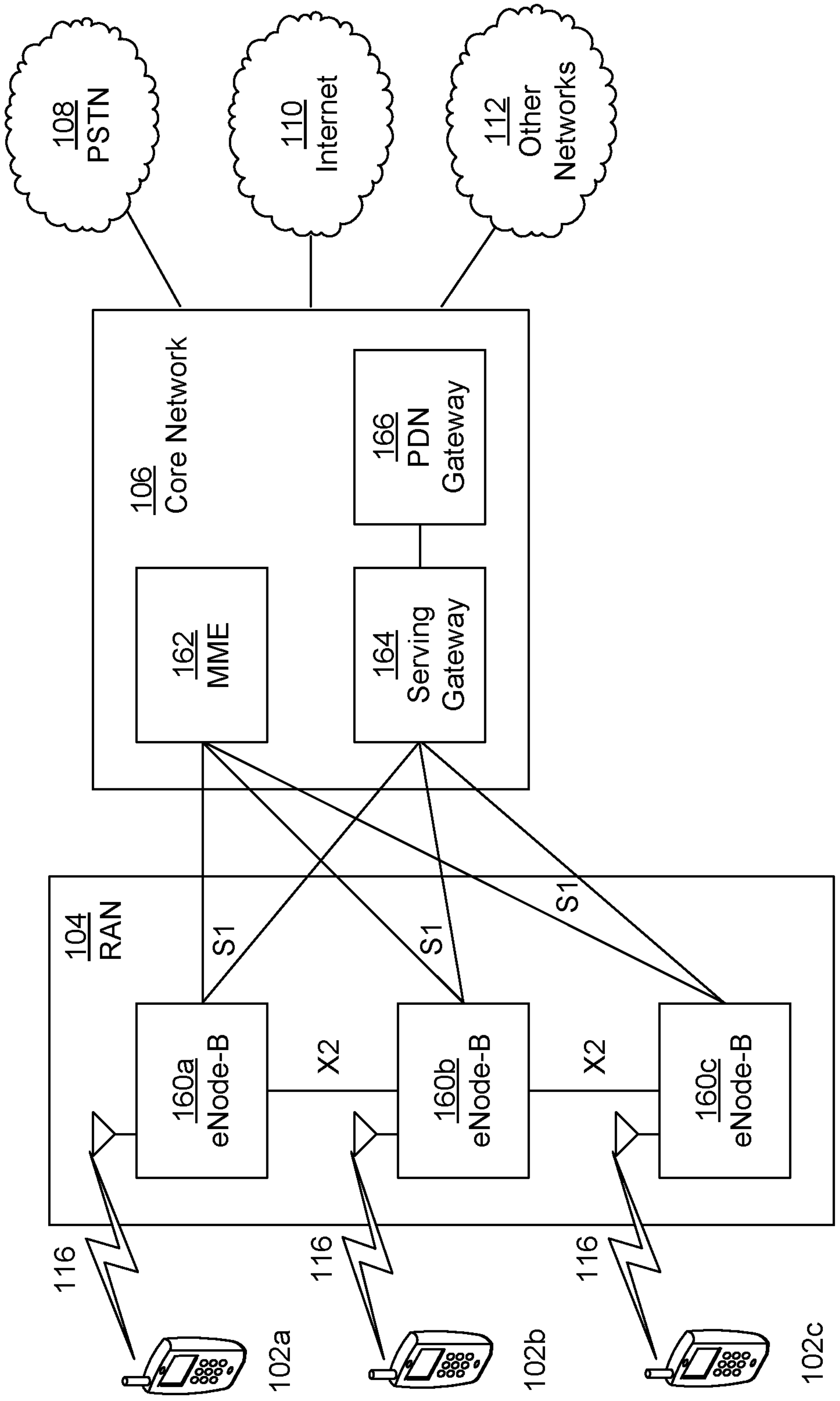
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network. In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHZ, 40 MHZ, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
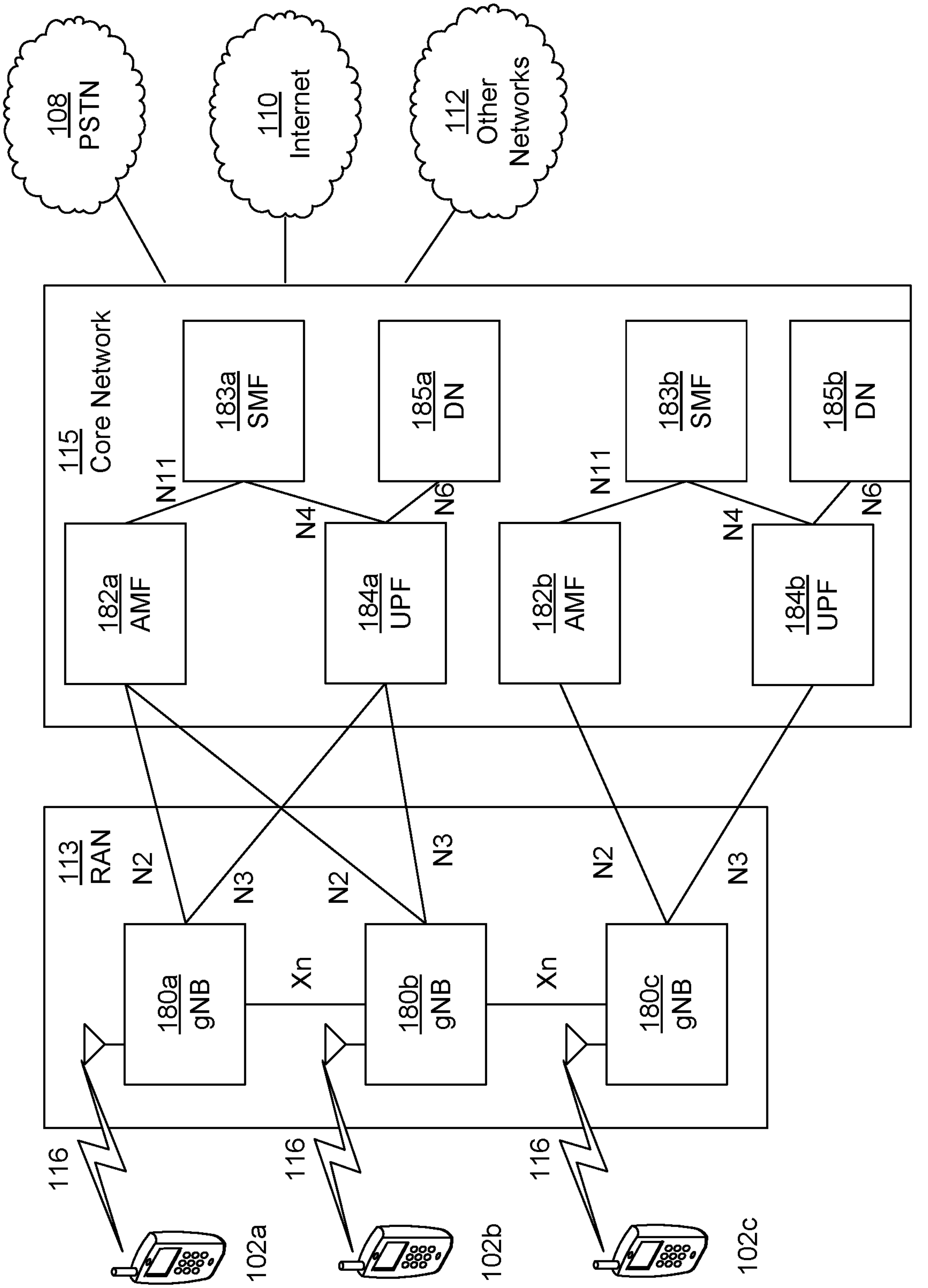
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In accordance with an 802.11ac infrastructure mode of operation, an AP may transmit a beacon on a fixed channel, which may be the primary channel. This channel may be 20 MHz wide, and may be the operating channel of the BSS. This channel may also be used by the STAs to establish a connection with the AP. The fundamental channel access mechanism in an 802.11 system may be Carrier Sense Multiple Access with Collision Avoidance (CSMA/CA). In this mode of operation, some or all STAs, including the AP, may sense the primary channel. If the channel is detected to be busy, the STA may back off. Hence, it may be the case that one STA may transmit at any given time in a given BSS.

In accordance with 802.11n specifications, High Throughput (HT) STAs may also use a 40 MHz wide channel for communication. This may be achieved by combining the primary 20 MHz channel with an adjacent 20 MHz channel to form a 40 MHz wide contiguous channel.

In accordance with 802.11ac specifications, Very High Throughput (VHT) STAs may support 20 MHz, 40 MHZ, 80 MHZ, and 160 MHz wide channels. The 40 MHZ, and 80 MHZ, channels may be formed by combining contiguous 20 MHz channels similar to 802.11n described above. A160 MHz channel may be formed either by combining 8 contiguous 20 MHz channels, or by combining two non-contiguous 80 MHz channels. This may also be referred to as an 80+80 configuration. For the 80+80 configuration, the data, after channel encoding, may be passed through a segment parser that divides it into two streams. IFFT, and time domain, processing may be performed on each stream separately. The streams may then be mapped on to the two channels, and the data may be transmitted. At the receiver, this mechanism may be reversed, and the combined data may be sent to the MAC layer.

To improve spectral efficiency, 802.11ac may support the concept for downlink Multi-User MIMO (MU-MIMO) transmission to multiple STAs in the same symbol time frame, e.g. during a downlink OFDM symbol. The potential for the use of downlink MU-MIMO may also be considered for 802.11ah specifications. It is important to note that since downlink MU-MIMO, as it is used in 802.11ac, may use the same symbol timing to multiple STA's interference of the waveform, transmissions to multiple STAs may not be an issue. However, all STAs involved in MU-MIMO transmission with the AP may need to use the same channel or band, this may limit the operating bandwidth to the smallest channel bandwidth that is supported by the STAs that are included in the MU-MIMO transmission with the AP.

Trigger Frames as may be supported by 802.11ax specifications are described herein. A trigger frame may be used to allocate resources and trigger single or multi-user access.

Figure 2:
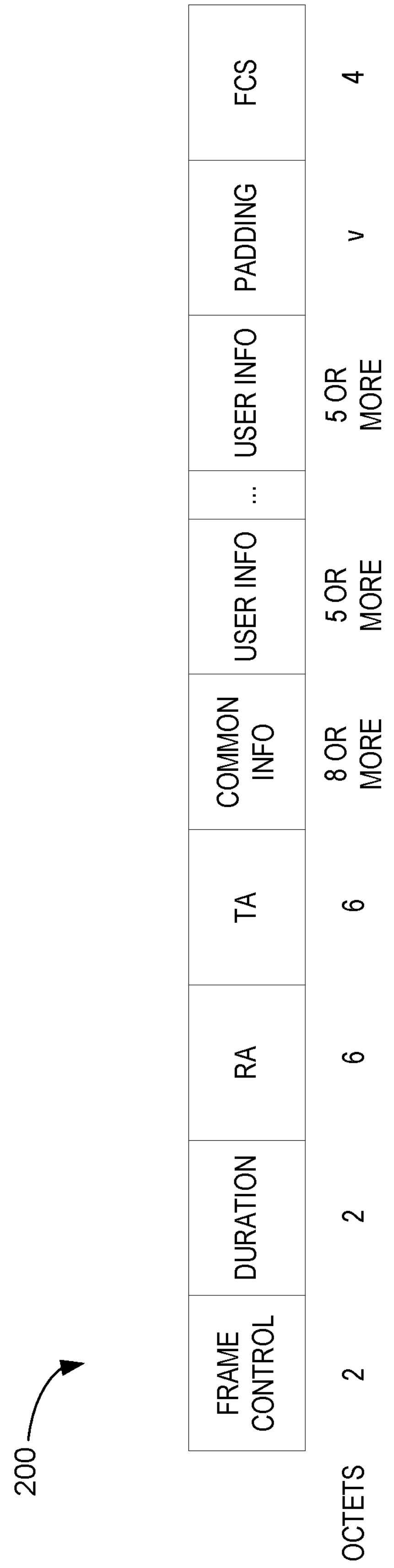
FIG. 2 is a table depicting an example of a Trigger frame format in 802.11ax.

FIG. 2 is a table depicting an example of a Trigger frame format in 802.11ax.

Figure 3:
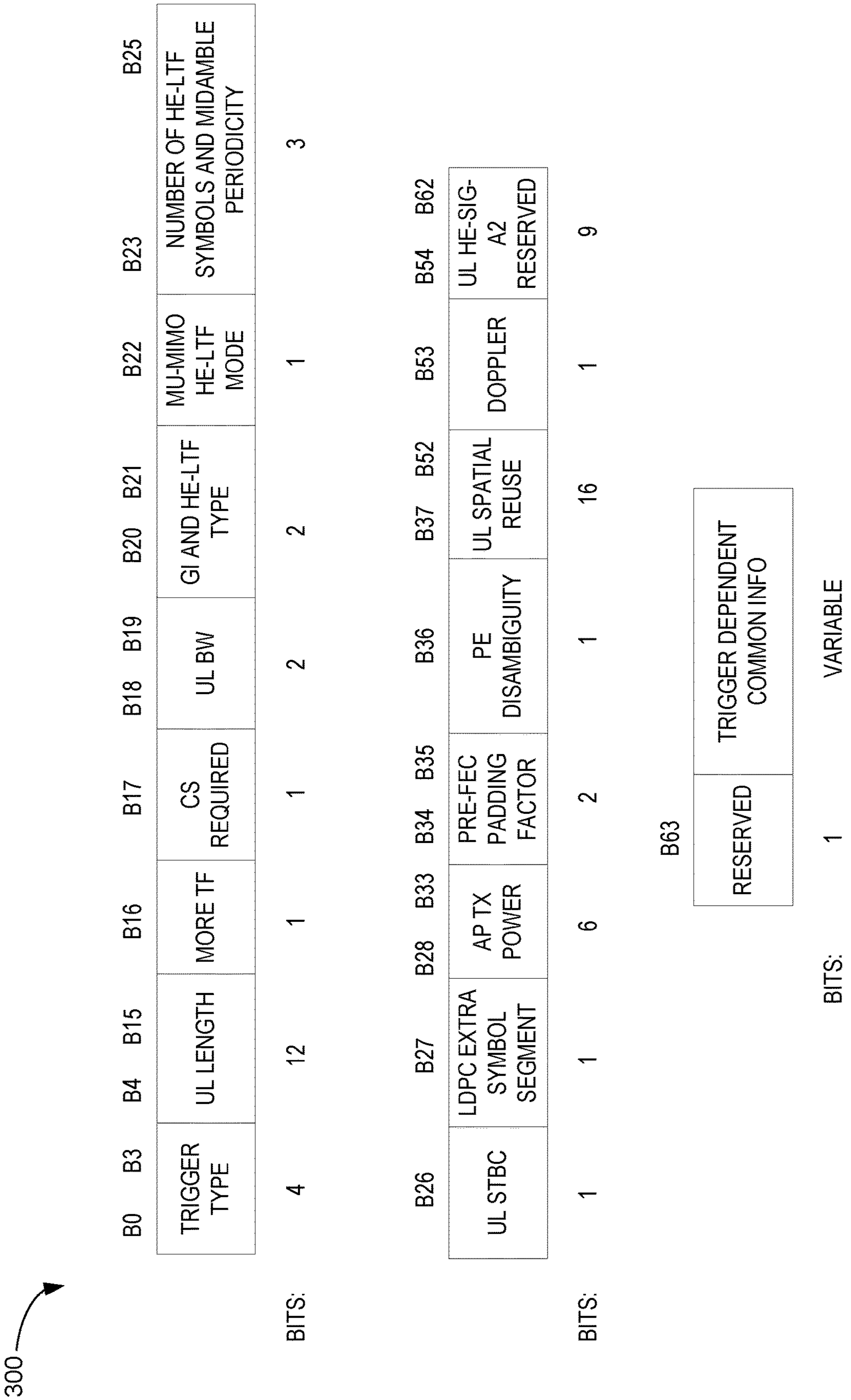
FIG. 3 is a table depicting an example of a Common Info field in a Trigger frame.

FIG. 3 is a table depicting an example of a Common Info field in a Trigger frame.

Figure 4:
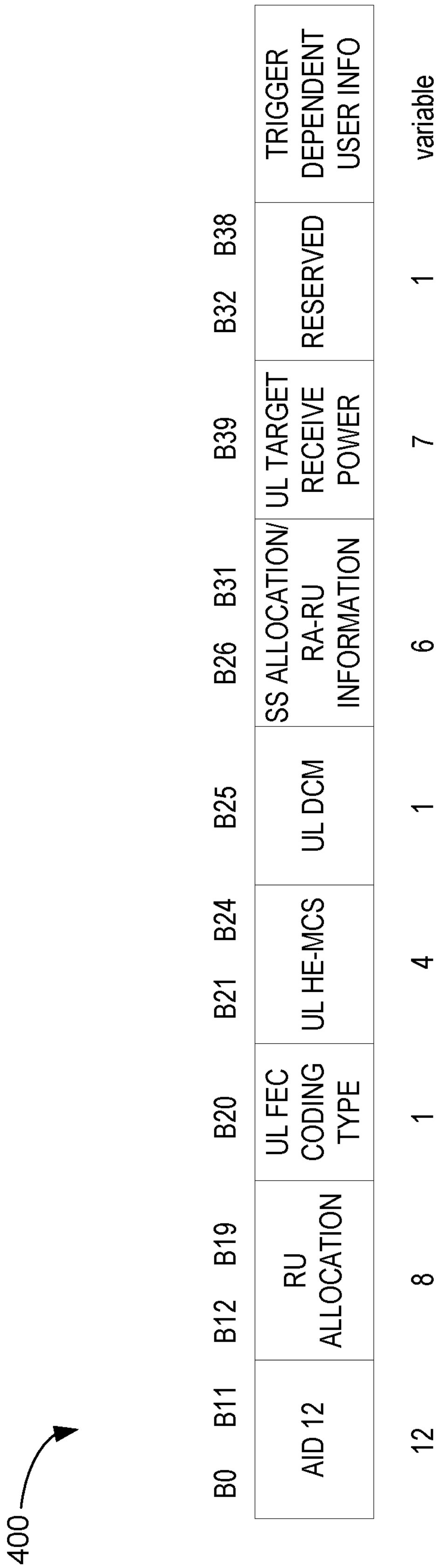
FIG. 4 is a table depicting an example of a User Info field in a Trigger frame.

FIG. 4 is a table depicting an example of a User Info field in a Trigger frame. The User Info field for all trigger types except Null Feedback Report Poll (NFRP) trigger may be defined as shown in FIG. 4.

FIG. 5 is a table depicting an example of a Trigger Type subfield in the Common Info Field. The Trigger Type subfield in the Common Info field may have possible values as shown in FIG. 5.

NFRP Trigger frames are described herein. The User Info field for an NFRP Trigger frame may be defined in FIG. 14, further described in paragraphs below.

Figure 6:
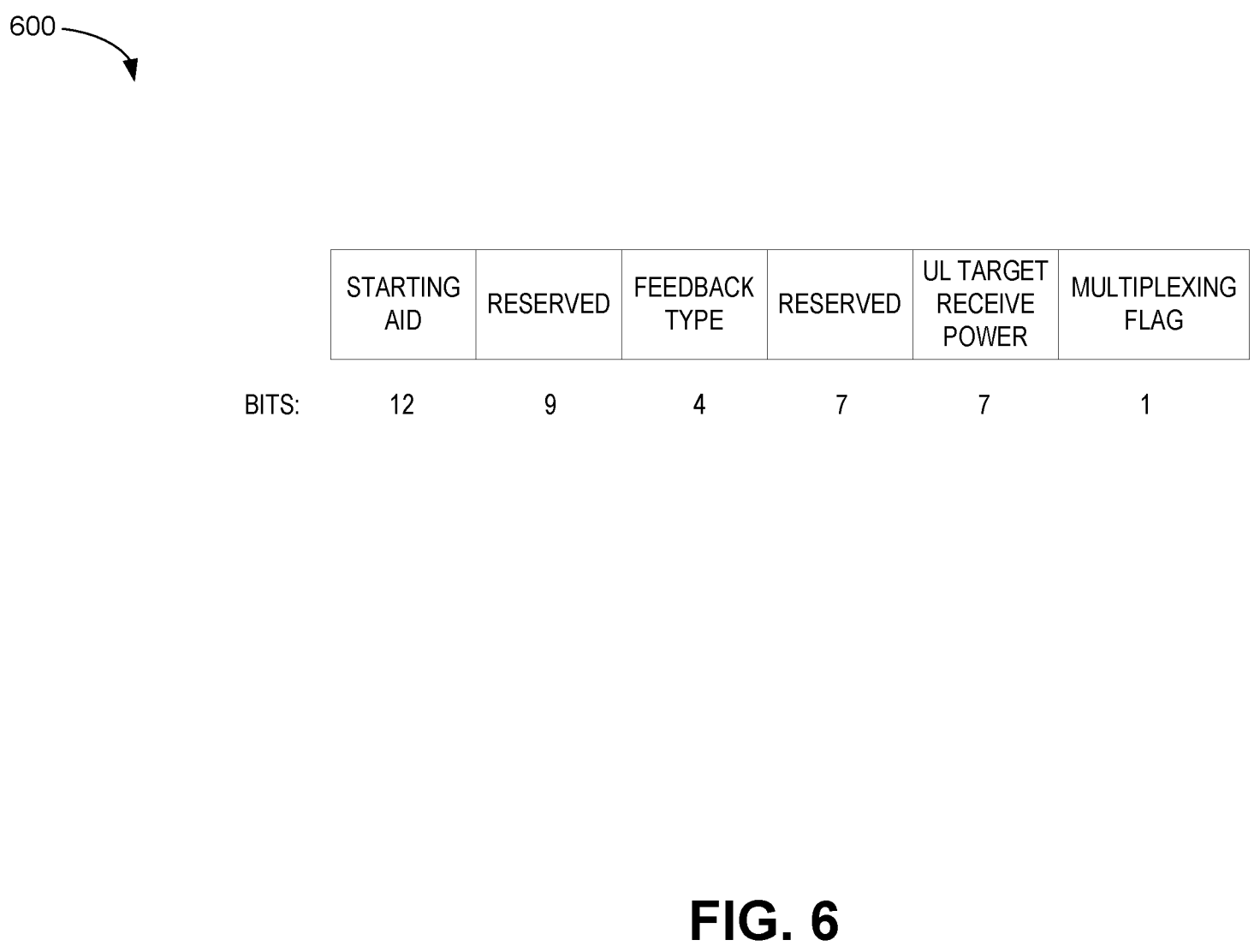

FIG. 6 is a table depicting an example of a User Info field format of an NFRP Trigger frame in accordance with 802.11ax specifications. The Feedback Type subfield set to value 0 may indicate a resource request. The remaining values may be reserved. The total number of STAs, $N_{STA}$, that are scheduled to respond to the NFRP Trigger frame may be calculated using $N_{STA}=18\times2^{BW}\times$(MultiplexingFlag+1). A STA with an AID value between the range [Starting AID, Starting AID+$N_{STA}-1$] may be eligible to respond to the NFRP Trigger.

Subchannel Selective Transmissions (SSTs) are described herein. In accordance with 802.11ax specifications, an SST mechanism may be defined to allow a STA to transmit and receive on a secondary channel. A HE SST non-AP STA and/or a HE SST AP may set up SST operation by negotiating a trigger enabled target wake time (TWT) using individual TWT agreements.

Figure 7:
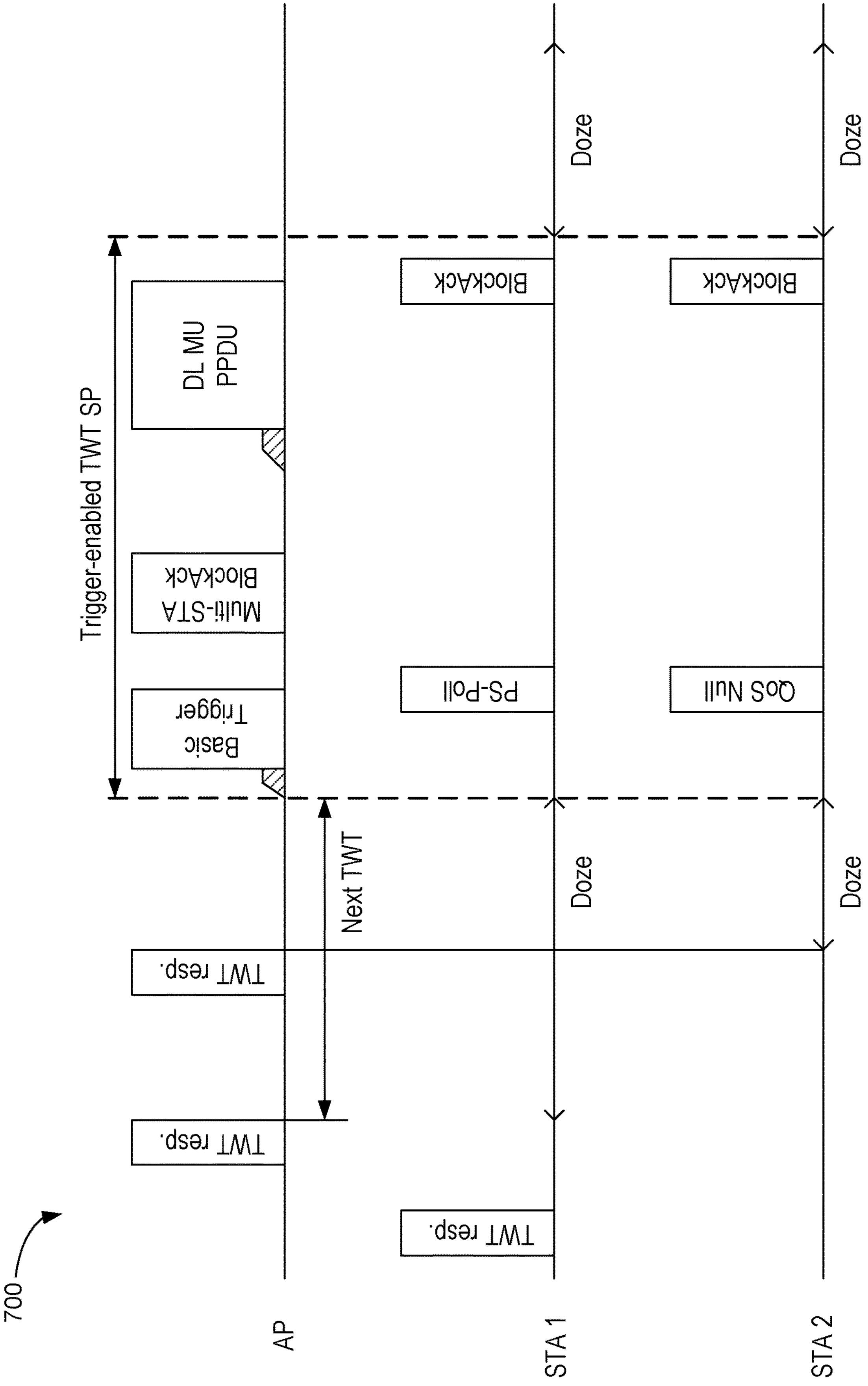
FIG. 7 is a diagram depicting an example of individual target wake time (TWT) operation.

FIG. 7 is a diagram depicting an example of individual TWT operation.

Extremely High Throughput (EHT) may be an advancement to IEEE 802.11 standards. EHT is formed to explore the possibility to further increase peak throughput and improve efficiency of the IEEE 802.11 networks. Example use cases and applications described herein include high throughput and low latency applications such as: Video-over-WLAN; Augmented Reality (AR); and Virtual Reality (VR).

A number of features may be implemented (e.g., in the EHT and 802.11be) to achieve the target of increased peak throughput and improved efficiency. These features may include: Multi-AP operation; Multi-Band/multi-link operation; 320 MHz bandwidth; 16 Spatial Streams; HARQ; AP Coordination; and additional designs for 6 GHz channel access.

Described herein are Trigger Frames in accordance with example 802.11 specifications, such as 802.11be specifications. EHT may support greater bandwidth (BW), Multiple resource unit (RU) allocation, enhanced modulation and coding scheme (MCS) and greater number of spatial streams. Trigger frame (TF) design may need to be modified to signal the allocation from the AP for these enhanced features and to signal the new fields of universal signal (U-SIG) of the trigger based (TB) physical protocol data unit (PPDU). EHT may define frequency domain aggregation of aggregated PPDUs. An aggregated PPDU (A-PPDU) may include multiple PPDUs. The PPDU format combinations may be limited to EHT and high efficiency (HE), while other combinations may be later determined. For PPDUs using the HE format, the PPDU BW may be determined in subsequent specification releases. The number of PPDUs in an A-PPDU may be determined. The A-PPDU may be a release-2 (R2) feature.

Figure 8:
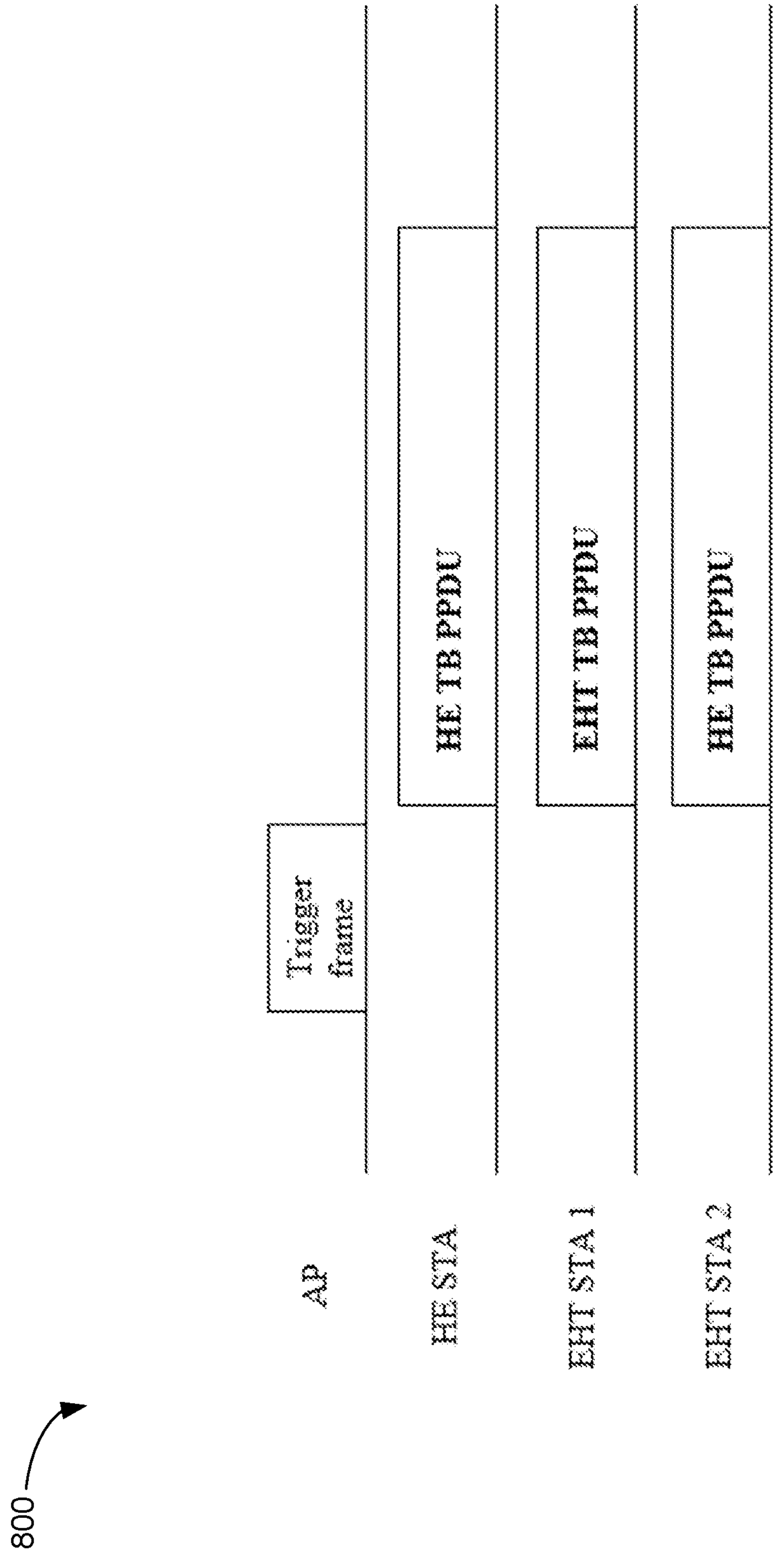
FIG. 8 is a diagram illustrating an example of a Trigger Frame for an A-PPDU.

The A-PPDU in UL from multiple STAs supporting different amendments may require a backwards-compatible trigger frame, as shown by way of example in Error! Reference source not found. FIG. 8, which is introduced in paragraphs above. In such examples, the AP may operate on a wideband channel, e.g., 320 MHz channel. The HE TB PPDU may be transmitted on the primary 160 MHz sub-channel and EHT TB PPDU may be transmitted on the secondary 160 MHz subchannel.

FIG. 8 is a diagram illustrating an example of a Trigger Frame for an A-PPDU. An EHT Trigger frame may use an 802.11ax Trigger frame as a baseline.

Figure 9:
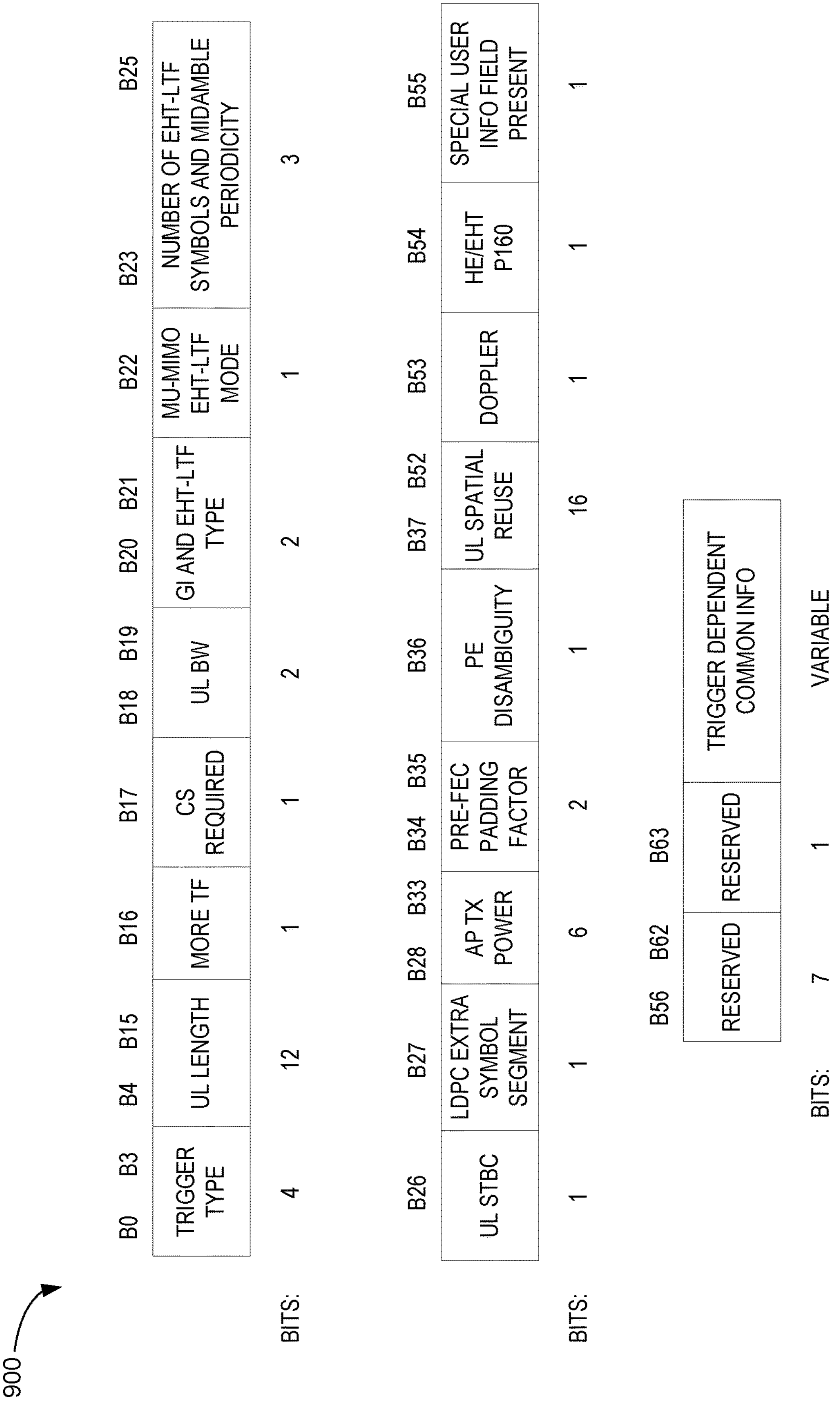
FIG. 9 is an illustration of a Common Info field of a Trigger frame.

FIG. 9 illustrates a Common Info field of a Trigger frame, and depicts an example of an EHT variant of the Common Info field.

Figure 10:
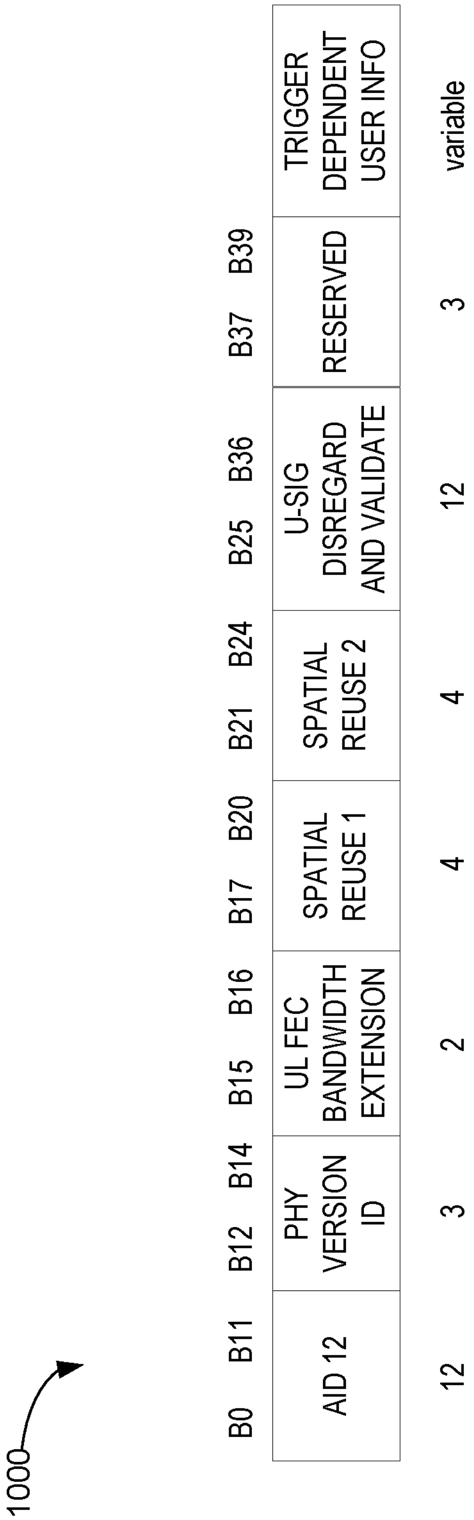
FIG. 10 is an example of a Special User Info field of Trigger frame.

FIG. 10 is an example of a Special User Info field of Trigger frame. A Special User Info field may be optionally present for EHT variant Trigger frames.

Figure 11:
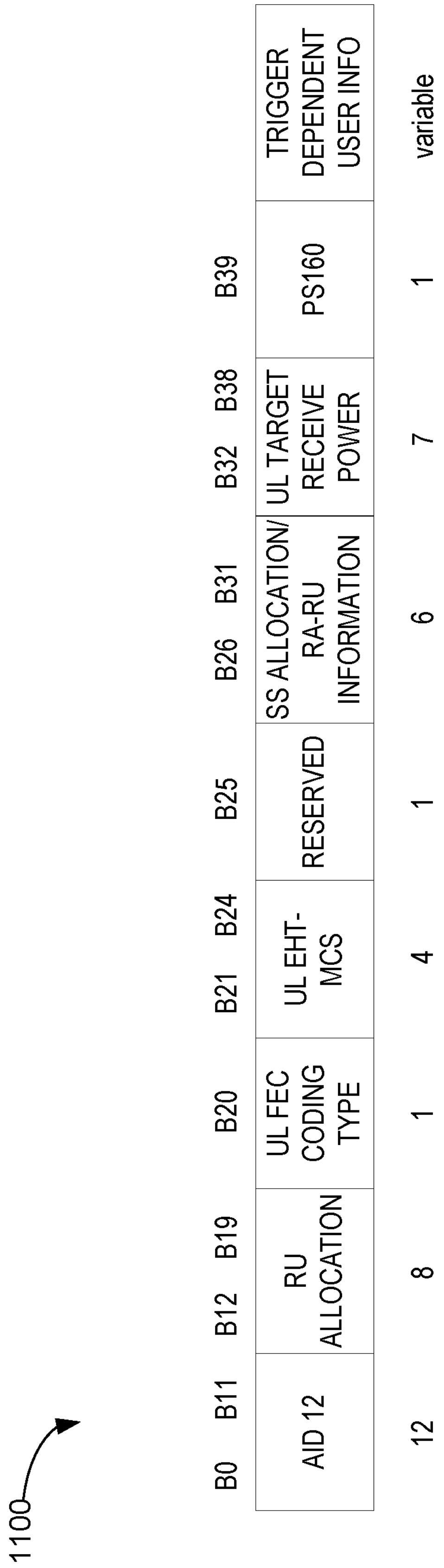
FIG. 11 is an example of an extremely high throughput (EHT) variant User Info field.

FIG. 11 is an example of an EHT variant User Info field.

FIG. 12 is an example of valid combinations of several bits with corresponding solicited TB PPDU format. More specifically, FIG. 12 illustrates valid combinations of B54 and B55 in the Common Info field, B39 in the User Info field, and the solicited TB PPDU format in an EHT Trigger frame.

RU allocation subfields in an EHT-SIG field of an EHT multi-user (MU) PPDU may be used to indicate a number of resource units allocated to a plurality of bandwidths. Table 1 depicts example RU allocation subfields for various bandwidths.

TABLE 1

Example RU allocation subfields for various bandwidths

| Bandwidth | RU-Allocation 1 M | RU-Allocation 2 N | Total Number of RU Allocation Subfields M + N |
|---|---|---|---|
| 20 | 1 | 0 | 1 |
| 40 | 1 | 0 | 1 |
| 80 | 2 | 0 | 2 |
| 160 | 2 | 2 | 4 |
| 320 | 2 | 6 | 8 |

FIG. 13 illustrates example allowed Modulation Coding Schemes (MCSs) for EHT-SIG symbols. EHT-SIG MCS subfield may be carried in an U-SIG field in an EHT MU PPDU to indicate the modulation and coding scheme used in EHT-SIG field. For example, a value of an EHT-SIG MCS field may indicate MCS information such as an EHT-MCS Index, a modulation, a coding rate, a number of bits per subcarrier, an effective number of data tones carrying unique data, a number of coded bits per OFDM symbol, and/or a number of data bits per OFDM symbol. In the example MCSs for EHT-SIG symbols shown in FIG. 13, R is the coding rate, $N_{BPSCS}$ is the number of bits per subcarrier per spatial stream, $N_{SD}$ is the effective number of data tones carrying unique data, $N_{CBPS}$ is the number of coded bits per OFDM symbol, and $N_{DBPS}$ is the number of data bits per OFDM symbol.

One or more of several problems may be addressed by solutions proposed herein. A first problem may be group-based SST. In accordance with 802.11ax specifications, SST may be performed using individual TWT through a unicast transmission, which may assign one STA to park to a secondary subchannel each time period (e.g., SST time period). More efficient SST assignment mechanism may be needed to better use the wide bandwidth.

A second problem may involve sounding protocols for group-based SST. When multiple STAs are notified to park on a secondary channel, it may be possible that each STA is not able to switch to the secondary channel. Therefore, the sounding protocol may be defined to guarantee each STA is able to sound the channel and send the CSI information of the secondary channel to AP.

A third problem may involve dynamic puncturing. An INACTIVE_SUBCHANNELS parameter may be defined in a TXVECTOR in accordance with 802.11 specifications (e.g., 802.11be specifications) to carry static inactive sub-channel information from MAC to PHY. The INACTIVE_SUBCHANNELS parameter may be set based on BSS level signaling, and thus may not be used to support more dynamic puncturing scenarios.

A fourth problem may involve A-PPDU support. In Trigger frames, there may be several bits defined using resolution 160 MHz. For example, an HE/EHT P160 subfield (e.g., as shown in FIG. 9) in the Common Info field may indicate the HE or EHT version of the TB PPDU triggered on the primary 160 MHz channel. A PS160 subfield (e.g., as shown in FIG. 11) in the User Info field may indicate the RU allocation is in one or more primary or secondary 160 MHz channels. Using the combination of above-mentioned subfields and/or other subfield may be enough for 802.11 (e.g., 802.11be) release 1 STAs to determine information about the upcoming transmission. However, with A-PPDU support in release 2, the existing signaling may not be enough for an A-PPDU capable STA to determine whether a transmission is an A-PPDU transmission and what kind of TB PPDU the STA should respond with.

A large number of EHT-SIG symbols may be signaled in an EHT MU PPDU. In some small RU/MRU allocation scenarios, the number of allocated users may be larger than a threshold, and the number of EHT-SIG symbols may be larger than a threshold as well. A Number of EHT-SIG Symbols field in U-SIG2 of the U-SIG field may be 5 bits and may signal up to 32 EHT-SIG symbols. In the scenarios where the number of allocated users is larger than a threshold, the number of EHT-SIG symbols may exceed 32 symbols and thus cannot be signaled using the current U-SIG field.

Various embodiments, any one or more of which may address one or more of the problems described in paragraphs above, are provided herein.

Embodiments are disclosed in the following paragraphs may be used to address at least the first problem described above. Some embodiments may involve group-based SST Using Special AID Assignment Rules. For example, a device (e.g., an AP) may assign resources for SST using AIDs. The device may determine the resources for SST based on the AIDs. The device may store the group-based SST Using Special AID Assignment Rules. The device may indicate a plurality of AIDs and one or more subchannels for SST. The plurality of AIDs may comprise a range of AIDs. The one or more subchannels may comprise one or more secondary subchannels. Each of the plurality of AIDs may correspond to a respective STA associated with the device, for example, with A-PPDU capability.

In some AID Assignment rules, STAs with A-PPDU capability may be assigned with contiguous AID numbers. STAs which may be able to operate in the secondary 80 MHz and/or 160 MHz subchannels may be assigned with contiguous AID numbers. For example, an AP may assign STAs with A-PPDU capability and/or with secondary 80 MHz/160 MHz operation capability contiguous AID numbers (e.g., when the STAs associate with the AP). The AP may group STAs with A-PPDU capability in a range of AID numbers, for example, because the STAs with A-PPDU capability may be capable of communicating SST (e.g., such as A-PPDU transmissions). The most significant bit (MSB) or the N MSBs of the AID12 or AID or AID11 assigned to A-PPDU capable STAs may start with a fixed value. Here, an AID may refer to the association ID assigned by an AP to a STA when the STA is associated with the AP.

An AID may have 16 bits, and AID12 may refer to the 12 LSB of the AID. The MSB of AID12 may be 0 since the maximum AID is 2007. In some examples, an AP may assign AID values greater than or equal to M (e.g., M=1024 may mean the first two MSB of AID12 set to 01) to A-PPDU capable STAs and assign AID values less than M (e.g., M=1024 may mean the first two MSB of AID12 set to 00) to STAs without A-PPDU features. The value M may be predefined. Alternatively or additionally, the value M may be selected by APs based on the ratio of A-PPDU capable devices in the BSS. In some embodiments, an AP may assign AIDs to STAs without A-PPDU features from the smallest possible AID values and assign AIDs to STAs with A-PPDU features from the largest possible AID values. The AP may indicate the value M to the STAs in the BSS. In some embodiments, the AP may announce the value M in a management frame or control frame.

In this way, AID values of STAs with A-PPDU capabilities may be in a range [A, B]. In examples, the range may be [1024,2007]. An AP may assign multiple A-PPDU capable STAs with AID in range [a,b] to secondary subchannel. Here [a, b] $\subseteq$[A, B].

Note, the examples described herein may include AIDs [0,M] assigned to STAs without A-PPDU capability and AIDs (M, $AID_{max}$] assigned to STAs with A-PPDU capability. Here $AID_{max}$ may be the maximum allowed AID value assigned to a STA. For example, an AP may assign AIDs [M1, M2] to STAs with A-PPDU capability. M1 and M2 may be predefined values or selected values by the AP.

Group Based SST Procedures are described herein. An NFRP SST may provide secondary channel assignments by which STAs may provide responses. One or more STAs or APs may perform sounding on the secondary channel.

Figure 14:
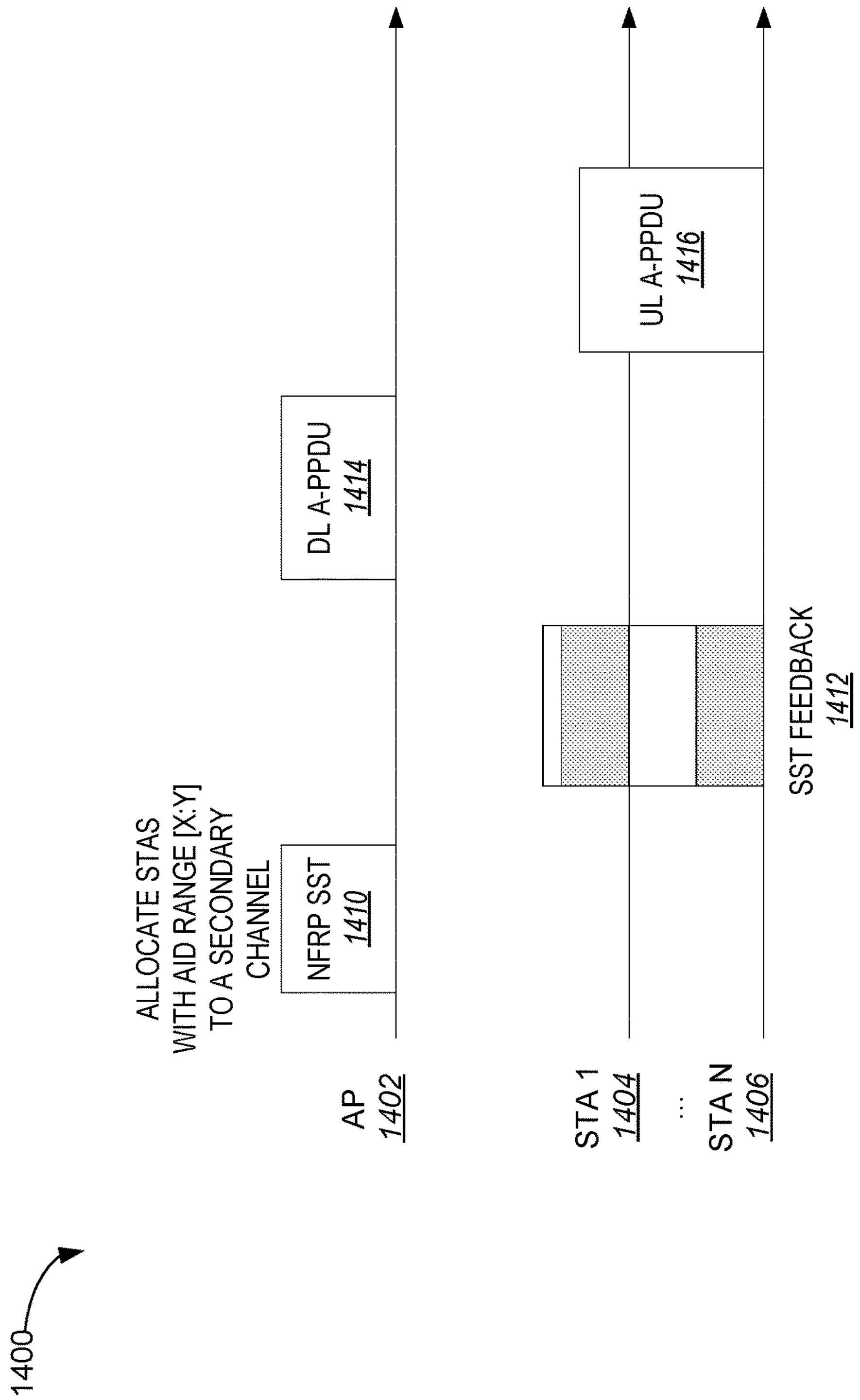
FIG. 14 is a diagram illustrating an example of a group-based subchannel selective transmission (SST) procedure using a null data packet (NDP) feedback report protocol (NFRP) SST Trigger frame.

FIG. 14 is a diagram illustrating an example of a group-based SST procedure 1400 using an NFRP SST Trigger frame 1410. As shown, an AP 1402 and one or more STAs 1404, 1406 may exchange capability information, including A-PPDU capability, at association stage. The AP 1402 may use AID assignment rule to assign AIDs to its associated STAs 1404, 1406 based on their A-PPDU capabilities.

The AP 1402 may acquire a channel by using CSMA/CA procedures. The AP 1402 may transmit (e.g., unicast, groupcast, or broadcast) a frame 1410 (e.g., a trigger frame) to a plurality of STAs 1404, 1406. The frame 1410 may request that a group of A-PPDU capable STAs park (e.g., monitor and/or perform start of packet detection for a predetermined period) on one or more secondary subchannels or one or more non-primary subchannels. For example, the AP 1402 may indicate (e.g., in the trigger frame 1410) the secondary subchannel for the group of A-PPDU capable STAs to monitor. In examples, the frame 1410 may be an SST variant NFRP Trigger frame (e.g., referred to as NFRP SST Trigger frame) with Feedback Type field set to SST. In the frame 1410, the AP 1402 may indicate SST information. The SST information may include a range of AID values (e.g., [x:y]) with which the corresponding STAs 1404, 1406 (e.g., STA 1 to STA N) are requested/suggested to park on a secondary subchannel; SST related information such as an SST channel, which may be a secondary subchannel indicated where the STAs 1404, 1406 will park during the upcoming SST period; an SST starting time and period, which may be the time duration on which the STAs 1404, 1406 will park on the SST subchannel; an SST periodicity (for example, if the SST occurs periodically, this field may indicate the periodicity); a non-punctured 20 MHz subchannel on the SST subchannel; and/or the responding TB PPDU related information, which may include a BW of the TB PPDU and/or a TB PPDU type and format (for example, whether a NDP PPDU is requested and what type of NDP PPDU is requested).

A STA 1404 may receive the trigger frame 1410. The STA 1404 may determine whether the AID of the STA 1404 is within the AID range indicated by the AP 1402. The STA 1404 may respond to the frame 1410 (e.g., trigger frame) with one or more feedback frames 1412 (e.g., one or more SST feedback frames), for example, when the AID of the STA 1404 is determined to be within the range of AIDs indicated in the trigger frame 1410. The STA 1404 may transmit the feedback frame(s) 1412 on the resource unit(s) indicated by the AP 1402 in the trigger frame 1410. In examples, the STA 1404 may transmit the feedback frame(s) 1412 via the primary subchannel(s). In examples, the STA 1404 may transmit the feedback frame(s) 1412 via the SST subchannel(s). In examples, the STA 1404 may use resource units on the subchannel indicated in the trigger frame 1410 to carry the feedback frame(s) 1412. The resource unit(s) used to carry the feedback frame(s) 1412 may be determined by its AID, transmission bandwidth, and/or multiplexing flag. The STA 1404 may indicate if it accepts the SST assignment (e.g., will monitor the subchannel(s)). For example, the STA 1404 may send feedback to the AP 1402 that indicates that the STA 1404 will monitor one or more of the subchannels (e.g., secondary subchannels). The STA 1404 may monitor the one or more subchannels for a duration defined by the SST period.

The STAs (e.g., STAs 1404, 1406) that accepted the SST assignment may monitor (e.g., switch to monitor) the SST subchannel at the SST starting time. For example, the STAs that accepted the assignment may have been monitoring another channel (e.g., subchannel) and switch to monitor the SST subchannel at the SST starting time. The AP 1402 and the STAs 1404, 1406 may transmit and receive on the SST subchannel(s) in the SST period. For example, the STAs 1404, 1406 may communicate with the AP 1402 via the SST subchannel(s) during the SST period indicated in the trigger frame 1410. The AP 1402 and the STAs 1404, 1406 may use A-PPDU 1414, 1416 to transmit and receive via the SST subchannel(s). For example, the AP 1402 may send one or more DL A-PPDUs 1414 to the one or more of the STAs 1404, 1406 via the SST subchannel(s). The STAs, 1404, 1406 may send one or more UL A-PPDUs 1416 to the AP 1402 via the SST subchannel(s).

A STA (e.g., an EHT SST non-AP STA) may indicate its capability of supporting NFRP SST Trigger. For example, the STA may indicate its capability of supporting NFRP SST Trigger in one capability element or field in (re-)Association Request frames and/or Probe Request frames and/or other types of management frames. A STA (e.g., an EHT SST AP STA) may indicate its capability of supporting NFRP SST Trigger in a capability element or field in one or more (Re-)Association Response frames, Probe Response frames, Beacon frames, and/or another type of management frames.

A STA (e.g., an EHT SST non-AP STA) may include a Channel Switch Timing element in (Re-)Association Request frames that it transmits to an AP (e.g., an EHT SST AP). The STA may use the Channel Switch Timing element to indicate a time used by the STA to switch between different subchannels. The AP may determine a duration of time that the STA might not be available based on the received channel switch timing element. For example, the STA may not be available to receive frames before the SST start time and after the end of the SST SP during the time indicated by the channel switch timing element. Using this information, the AP and/or STAs may pad dummy symbols before, after, and/or in the middle of its transmission, for example, to hold control of the channel(s).

Enhanced Trigger Frame and Feedback Frame designs may be provided. In examples, an NFRP Trigger frame may be modified to carry SST information. The modified NFRP Trigger frame may be an NFRP SST Trigger frame. For example, an NFRP SST Trigger frame may include a Common Info field, a Special User Info field, and/or a User Info field (e.g., an NFRP SST version).

Figure 15:
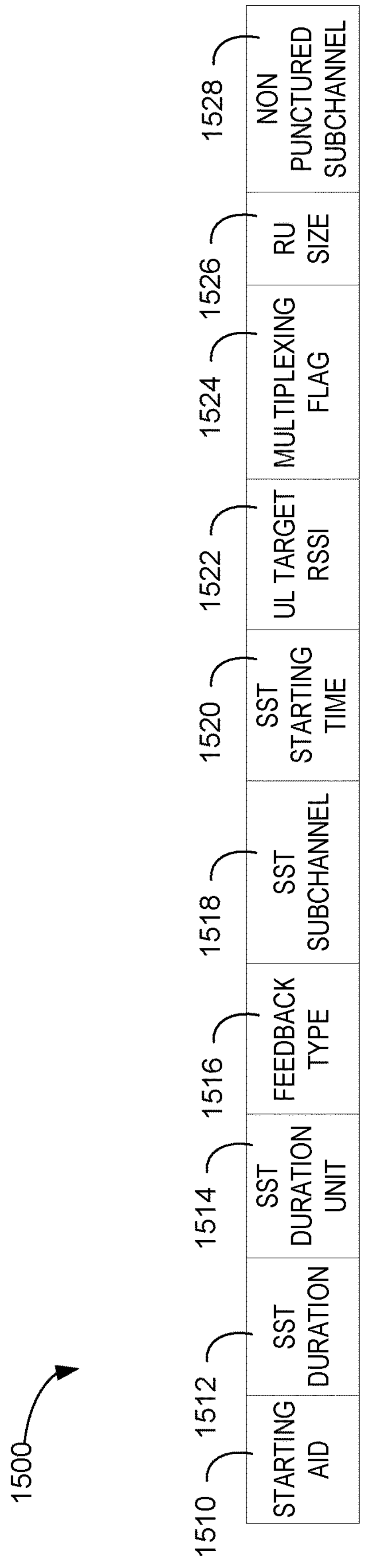
FIG. 15 is a table illustrating an exemplary design for a User Info field of a NFRP trigger SST variant.

FIG. 15 is a table illustrating an exemplary design for a User Info field 1500 of a trigger frame (e.g., an SST variant NFRP trigger frame). The NFRP SST version of the User Info field 1500 may be formatted as shown in FIG. 15. One or more subfields mentioned in paragraphs below may be included in the User Info field 1500 in NFRP SST Trigger.

The User Info Field 1500 may include a Starting AID subfield 1510. The starting AID subfield 1510 may indicate a starting AID. The starting AID may define a first AID in a range of AIDs. The range of AIDs may be the range of AIDs that are scheduled to respond to the NFRP Trigger frame, SST variant.

The User Info field 1500 may include an SST duration subfield 1512. The SST duration subfield 1512 may indicate an SST duration. The SST duration may indicate an amount of time that the intended STAs are expected to park on the SST subchannels.

The User Info field 1500 may include an SST duration unit subfield 1514. The SST duration unit subfield 1514 may indicate a unit of the SST duration subfield. The SST duration unit subfield may be set to 0 if the unit is T1 microseconds and may be set to 1 if the unit is T2 microseconds.

FIG. 16 illustrates an example encoding of an Exemplary Feedback Type subfield 1600 (e.g., such as the Feedback Type subfield 1516 shown in FIG. 15), which may be included in a User Info Field (e.g., such as the User Info Field 1500 shown in FIG. 15). The Exemplary Feedback Type subfield 1600 may indicate a feedback type and NFRP trigger type. The feedback type may indicate a type of feedback for the STAs to use in response to a trigger frame (e.g., such as the trigger frame 1410 shown in FIG. 14). One value may be used to indicate an SST request. For example, the User Info field may carry information for SST assignment from the AP. When the Feedback Type subfield 1600 as shown in FIG. 16 is set to SST Request, the User Info field may use the format designed for SST, e.g., as shown in FIG. 15 and a responding frame may be an SST responding frame.

Referring again to FIG. 15, the User Info field 1500 may include an SST Subchannel subfield 1518. The SST Subchannel subfield 1518 may indicate one or more SST subchannel(s) on which the STAs may park during an upcoming SST period.

The User Info field 1500 may include an SST Starting Time subfield 1520. The SST Starting Time subfield 1520 may indicate a starting time of the SST period. In examples, the starting time may be a time offset from the ending/beginning point of the NFRP SST Trigger frame.

The User Info field 1500 may include an UL Target RSSI subfield 1522. The UL Target RSSI subfield 1522 may indicate an expected received RSSI by the AP.

The User Info field 1500 may include a Multiplexing Flag subfield 1524. The Multiplexing Flag subfield 1524 may indicate a number of spatial multiplexed users allowed on the same RU. The number of spatial multiplexed users allowed on the same RU may be encoded as the number of STAs minus 1. In examples, the Multiplexing Flag subfield, effective BW (calculated using BW subfield in Common field, BW extension subfield in Special User Info field and other Puncturing related information fields), and/or an RU allocation may be used to determine the number of STAs which are requested to use an SST channel. For example, the determined number of STAs may be expressed as:

$$N_{STA} = N_{RUper20} \times 2^{eBW} \times (MultiplexingFlag + 1)$$

Here, $N_{RUper20}$ may be the number of Rus per 20 MHz subchannel. This number may be determined when the size of RU allocated to SST responding PPDU (RU Size subfield) is given. Alternatively, or additionally, the RU size may be predefined.

The User Info field 1500 may include an RU size subfield 1526. The RU size subfield 1526 may indicate an RU size for SST responding frame/PPDU per user.

The User Info field 1500 may include a Non-Punctured Subchannel subfield 1528. The Non-Punctured Subchannel subfield 1528 may indicate one or more 20 MHz or 40 MHz subchannels on the SST channel which will not be punctured during the SST period.

Other possible subfields carried in the trigger frame (e.g., NFRP Trigger SST variant) may include an SST periodicity subfield. The SST periodicity subfield may indicate a periodicity of the SST. One value of the SST periodicity subfield may indicate that the SST is not periodically present. A plurality of other values (e.g., the rest of the values) of the SST periodicity subfield may indicate a plurality of different periodicities. The trigger frame may indicate an SST duration. For example, the SST duration may be represented as an exponential function with a magnitude and an exponent. Therefore, a magnitude subfield and an exponent subfield may be used to indicate a value for the SST duration.

SST Trigger Frames may be provided for SST assignment. In examples, a value in a Trigger Type subfield (e.g., in a Common Info field) may be used to indicate the SST Trigger frame. In examples, when the Trigger Type subfield indicates an SST Trigger frame, the User Info field 1500 may use the format shown in FIG. 15. In examples, when the Trigger Type subfield indicates an SST Trigger frame, the User Info field may use a basic Trigger format. One or more of the subfields identified in FIG. 15 may be carried in a Trigger Dependent Common Info subfield and/or a Trigger Dependent User Info subfield.

SST Responding NDP PPDU designs are described herein. An SST Responding NDP PPDU may be used to carry NDP SST responding information. In examples, an SST Responding NDP PPDU may be designed based on an HE TB feedback NDP PPDU and/or an EHT TB PPDU, possibly with some modifications.

Figure 17:
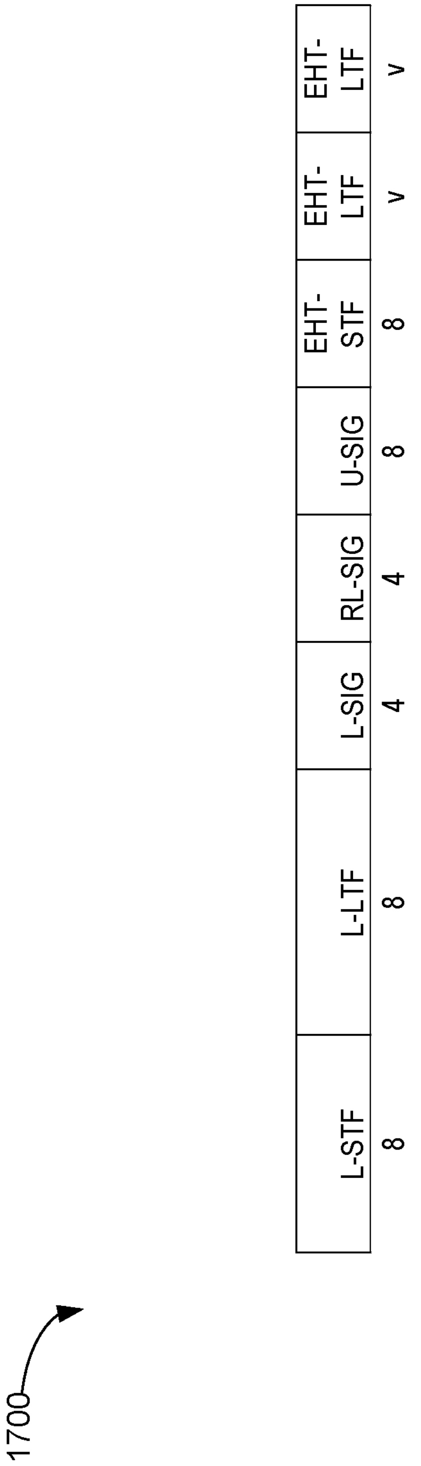
FIG. 17 is an example of an SST Responding NDP PPDU design.

FIG. 17 is an example of an SST Responding NDP PPDU 1700. The SST Responding NDP PPDU 1700 may use the format shown in FIG. 17, for example, when sending an UL PPDU (e.g., such as the UL A-PPDU 1416 shown in FIG. 14). The EHT-LTF field(s) may comprise a predefined length and/or format, for example, 2 OFDM symbols with 4× EHT-LTF and 3.2 us GI. The EHT-STF and/or the pre-EHT modulated fields may be transmitted on the 20 MHz channel where the STA is assigned.

A STA that is transmitting the SST Responding NDP PPDU 1700 may determine its allocated RU tones, for example, by comparing its AID with a Starting AID carried in the Trigger frame. In examples, N contiguous or distributed tones may be allocated to one or more STAs to transmit the SST Responding NDP EHT-LTF sequence and/or indicate that the STA(s) accept the SST assignment. Another N contiguous or distributed tones may be allocated to one or more STAs to transmit the SST Responding NDP EHT-LTF sequence and indicate that the STA(s) do NOT accept the SST assignment.

SST Negotiation Procedures using A-Control fields are described herein. SST negotiation procedures using A-Control fields may enable more efficient SST assignment and/or better use of the bandwidth. Information for SST negotiation between STAs or assignment from AP to STAs may be carried in the Control field, such as the A-Control field, in MAC header.

Individual SST negotiation using the A-Control field are described herein. A non-AP STA may transmit an SST request in an A-Control field in a data frame or management frame. On reception of the SST request in an A-Control field, an AP may respond with a full TWT element as SST response. Alternatively or additionally, the AP may respond with an SST response in an A-Control field. Alternatively or additionally, an AP may transmit a frame with an SST Control subfield with an SST assignment without any solicitation from the non-AP STA.

In examples, an SST Control subfield may be defined as a variant of an A-Control subfield of the HE variant HT Control field in MAC header. One Control ID value may be used to indicate the SST Control field as shown in FIG. 18.

FIG. 18 is a table illustrating exemplary Control ID subfield values 1800 including an SST Control subfield. The example Control ID subfield value 1800 set to 8 may indicate the EHT SST Control subfield. The example Control ID subfield values 1800 may include a triggered response scheduling subfield, an operating mode subfield, an HE link adaptation subfield, a buffer status report subfield, an UL power headroom subfield, a bandwidth query report subfield, a command and status subfield, an EHT operating mode subfield, an EHT SST control subfield, a ones need expansion surely subfield, and/or one or more reserved subfields.

Figure 19:
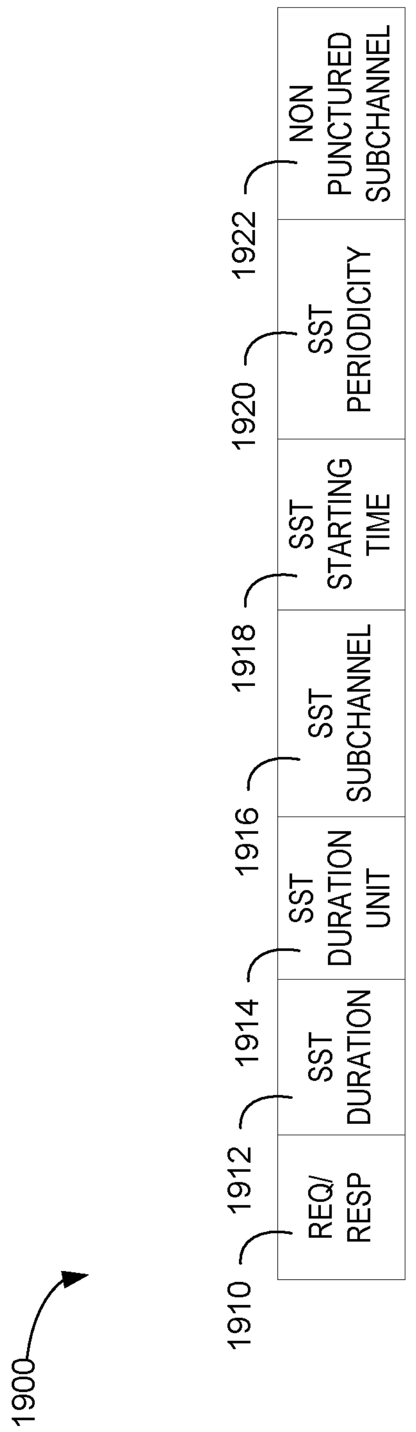
FIG. 19 is a table illustrating an exemplary SST Control subfield with individual SST negotiation.

FIG. 19 depicts an example SST Control Subfield 1900. In examples, the SST Control subfield 1900 depicted in FIG. 19 may be used in a unicast frame transmission with individual SST assignment. The SST Control Subfield 1900 may include a Request/Response subfield 1910. The Request/Response subfield 1910 may indicate whether the SST Control Subfield 1900 is an SST request or response. In an SST request, some or all of the following subfields may be suggested values, and in an SST response, some or all of the following subfields may be assigned values.

The SST Control Subfield 1900 may include an SST duration subfield 1912. The SST duration subfield 1912 may indicate an amount of time in the unit indicated by the SST duration unit subfield that the intended STAs are expected to park on the SST subchannels.

The SST Control Subfield 1900 may include an SST duration unit subfield 1914. The SST duration unit subfield 1914 may indicate the unit of the SST duration field. The SST duration unit subfield may be set to 0 if the unit is T1 microseconds and may be set to 1 if the unit is T2 microseconds.

The SST Control Subfield 1900 may include an SST Subchannel subfield 1916. The SST Subchannel subfield 1916 may indicate one or more SST subchannel(s) that the STA may park during the upcoming SST period.

The SST Control Subfield 1900 may include an SST Starting Time subfield 1918. The SST Starting Time subfield 1918 may indicate a starting time of the SST period. In examples, the starting time may be a time offset from the ending/beginning point of the NFRP SST Trigger frame.

The SST Control Subfield 1900 may include an SST periodicity subfield 1920. The SST periodicity subfield 1920 may indicate a periodicity of the SST. One value of the SST periodicity subfield 1920 may indicate that the SST is not periodic. One or more other values (e.g., the rest of the values) of the SST periodicity subfield 1920 may indicate a plurality of different periodicities for the SST.

The SST Control Subfield 1900 may include a Non-Punctured Subchannel subfield 1922. The Non-Punctured subfield 1922 may indicate one or more 20 MHz or 40 MHz subchannels on the SST channel that will not be punctured during the SST period.

Embodiments directed to Group SST Assignment Using A-Control Fields are described herein. An AP may transmit a broadcast frame and include an SST Control subfield in the A-Control field in the MAC header. The AP may use an AID assignment rule substantially according to one of the embodiments described in paragraphs above.

Figure 20:
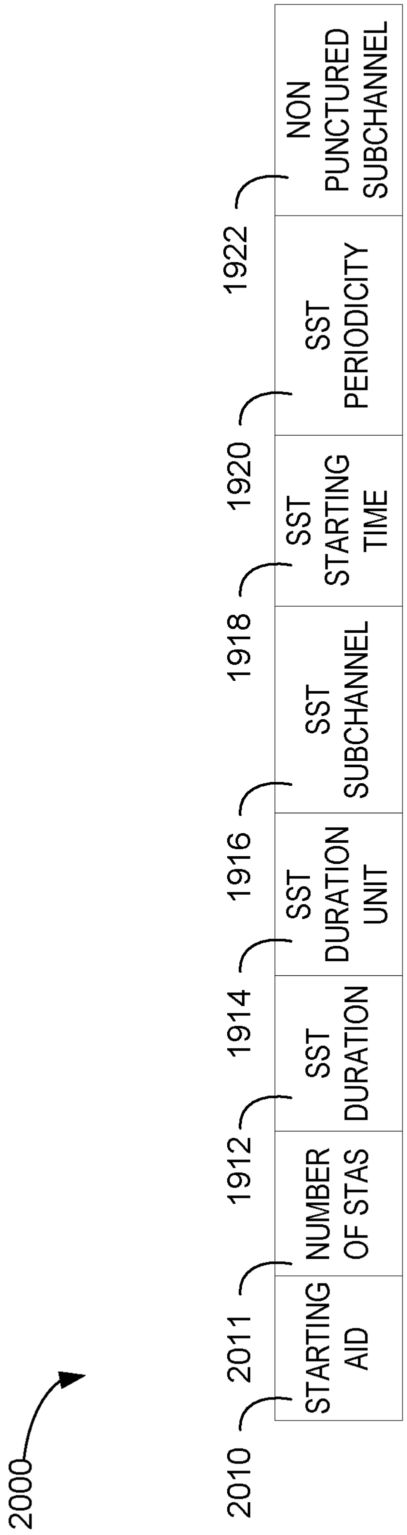
FIG. 20 is a table illustrating an exemplary SST Control subfield with group SST assignment.

FIG. 20 is a table illustrating an exemplary SST Control subfield 2000 with group SST assignment. Subfields in the example SST Control subfield 2000 may be the same as those shown in FIG. 19 except two subfields: the Starting AID and Number of STAs. The Starting AID subfield 2010 may define the first AID of the range of AIDs corresponding to STAs which are assigned to park on a secondary subchannel. The Number of STAs subfield 2011 may indicate the number of STAs which are assigned to park on a secondary subchannel. STAs with AID in the range of [Starting AID: Starting AID+Number of STAs−1] may be parked on the secondary subchannel based on this assignment.

Embodiments directed to sounding protocols for Group Based SST are described herein. Sounding protocols may be provided such that STAs (e.g., all STAs in a BSS) can switch to a secondary channel. Sounding Procedures for STAs with Group Based SST are provided herein.

Multiple group-based-SST scenarios may enable different sounding procedures. In some scenarios, an AP may initiate a group based SST as indicated herein. If all the enabled STAs can operate on the secondary channel, then an NDPA can be sent on either the primary channel or the secondary channel. NDP, BFRP Trigger frame and/or corresponding beamforming reports/CQI may be sent on the secondary channel.

Figure 21:
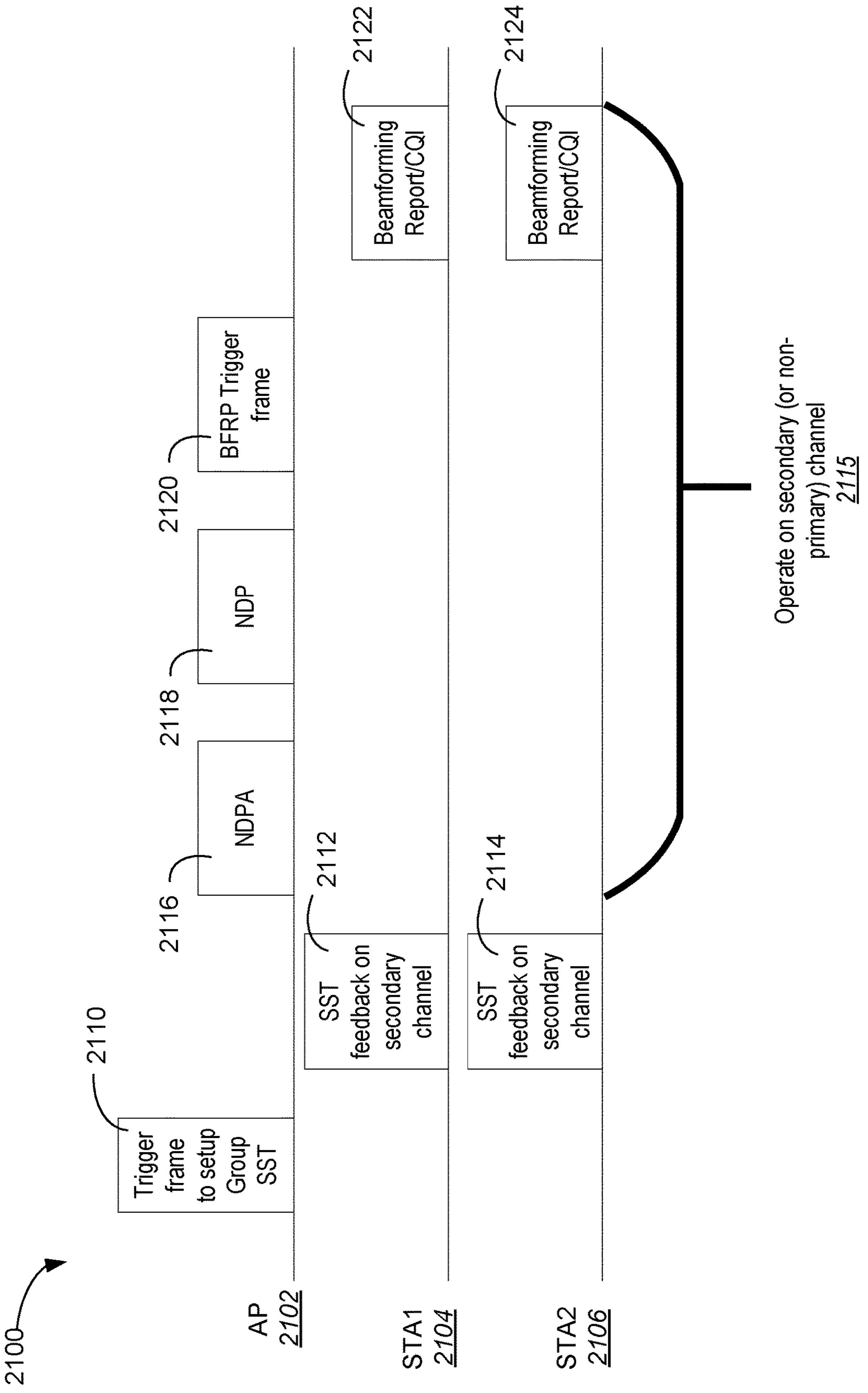
FIG. 21 is an exemplary illustration of sounding procedures in group-based SST occurring on secondary channels.

FIG. 21 is an exemplary sounding procedure 2100 in group-based SST occurring on secondary channels (e.g., secondary channels only). The AP 2102 (e.g., the AP STA) may indicate the sounding BW for each STA 2104, 2106 via the STA Info field in the EHT Announcement (NDPA) frame 2116. For example, if the AP 2102 operating BW is 160 MHZ, the sounding BW is 80 MHz (i.e., the BW of the EHT NDPA frame is 80 MHz), and switches its operating channel from the primary 80 MHz to the secondary 80 MHz, then the indication of Feedback Bitmap in Partial BW Info subfield format of STA field in the EHT NDPA frame 2116 may be 00000xxxx. It should be noted that although there are two STAs 2104, 2106 depicted in FIG. 21, such embodiments may be extended to more than two STAs.

The AP 2102 may send a trigger frame 2110, for example, to setup group SST. The AP 2102 may send the trigger frame 2110 to one or more STAs 2104, 2106. The one or more STAs 2104, 2106 may send SST feedback 2112, 2114 to the AP 2102 on a secondary channel. The one or more STAs 2104, 2106 may be configured to operate 2115 on the secondary channel.

In examples, each STA may not be able to switch to the non-primary (secondary channel). In the SST feedback, a non-AP STA may indicate whether it is able to operate on the secondary channel or not, for example, using the SST feedback 2112, 2114. Then the AP STA may need to initiate a sounding procedure, for example, in response to determining to operate at 2115 on the secondary channel. In examples, the AP 2102 may send an NDPA 2116 on the primary channel (or duplicated NDPAs 2116 on both the primary and non-primary channels or different NDPAs on the primary and non-primary channels respectively) and send duplicated NDPs 2118 on both primary and non-primary channels. After that, the AP 2102 may send BFRP trigger frames 2120 on both primary and non-primary channels. The NDPA BW may be the same as the NDP BW. The beamforming reports/CQI 2122, 2124 from STAs may be sent on the non-AP STA operating channels, respectively.

Figure 22:
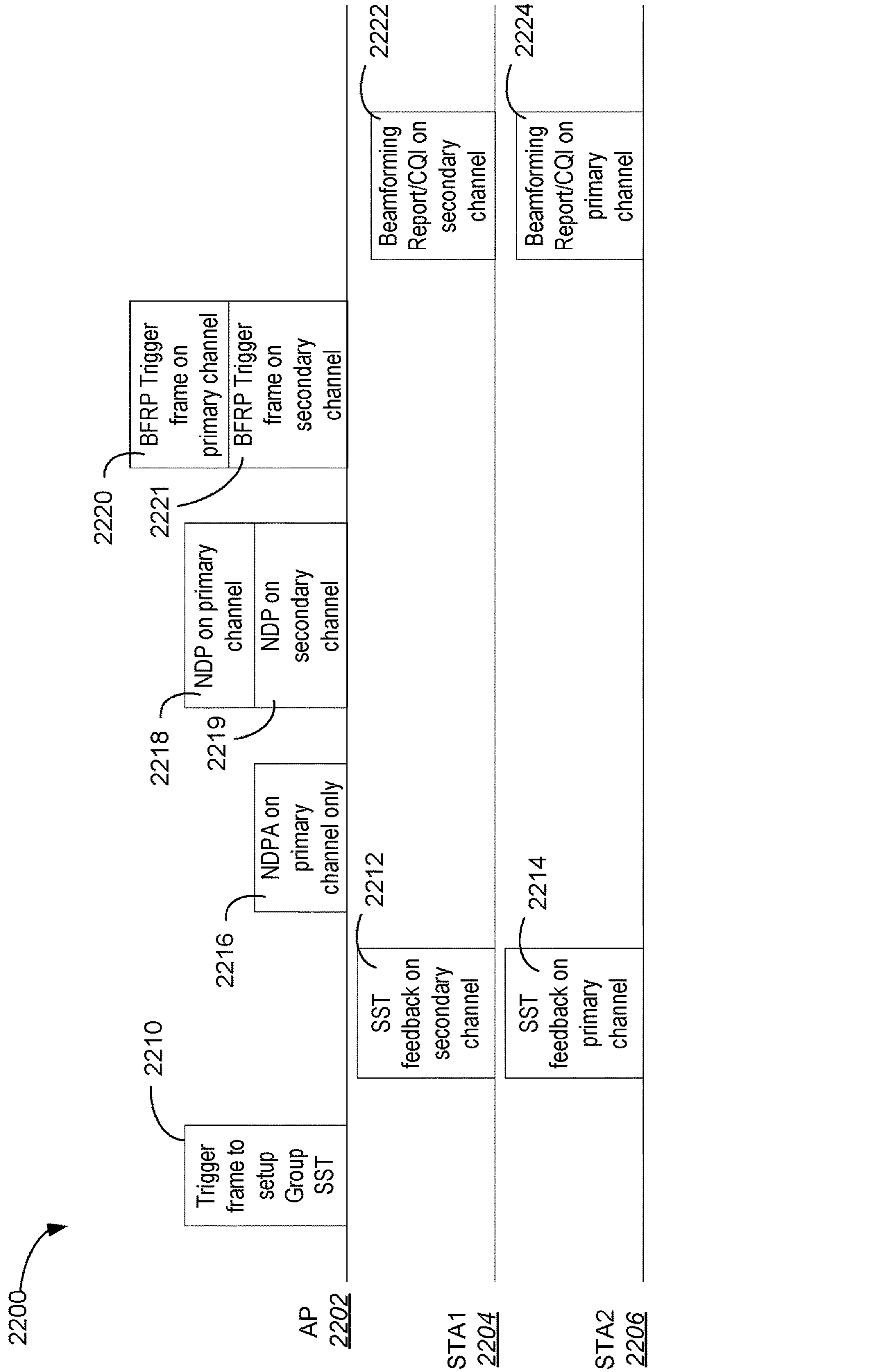
FIG. 22 is an exemplary illustration of sounding procedures in group-based SST occurring on both primary and secondary channels.

FIG. 22 is an exemplary parallel sounding procedure 2200 in group-based SST occurring on both primary and secondary channels. As shown in FIG. 22, the NDPA 2216 may be transmitted on the primary channel (e.g., the primary channel only). However, there may exist more than one NDPA transmission format as indicated in the following paragraphs.

An AP 2202 may send a trigger frame 2210, for example, to setup group SST. The AP 2202 may send the trigger frame 2210 to one or more STAs 2204, 2206. The one or more STAs 2204, 2206 may send SST feedback 2212, 2214 to the AP 2202 on the primary channel or a secondary channel. For example, the STA 2204 may send SST feedback 2212 on the secondary channel and the STA 2206 may send SST feedback 2214 on the primary channel.

In examples, the NDPA 2216 is sent on the primary channel only. In other examples, an NDP 2218 may be sent on the primary channel and an NDP 2219 may be sent on the secondary channel. The AP 2202 may send a BFRP trigger frame 2220, 2221 to the STAs 2204, 2206 on the primary channel and/or the secondary channel. For example, the AP 2202 may send the BFRP trigger frame 2220 on the primary channel and the BFRP trigger frame 2221 on the secondary channel. The STAs 2204, 2206 may send a beamforming report and/or CQI via the primary channel or a secondary channel. For example, STA 2204 may send a beamforming report/CQI 2222 via the secondary channel and STA 2206 may send a beamforming report/CQI 2224 via the primary channel.

The total number of STA Info may be equal to the total number of STAs in a Group Based SST. The STA Info field contents may differ from STA by STA. For example, in the case of AP STA operating BW is 80 MHz, the indication of Feedback Bitmap in Partial BW Info subfield format of STA field in the EHT NDPA frame will be 00000xxxx for the STAs operated on the secondary 80 MHz channel; the indication of Feedback Bitmap in Partial BW Infor subfield format of STA field in the EHT NDPA frame will be 0xxxx0000 for the STAs operated on the primary 80 MHz channel.

In examples, the NDPAs are sent on the primary and secondary channels. In such cases, the number of STA Info contained on NDPA may depend on the number of STAs operating on the primary channels/secondary channels. If the number of STAs operating on primary channel is n1, then the total number of STA Info contained on the primary channel NDPA may be equal to n1; similarly, if the number of STAs operating on the secondary channel is n2, then the total number of STA Info contained on the secondary channel may be equal to n2. For example, in the case of AP STA operating BW is 80 MHz, the indication of Feedback Bitmap in Partial BW Infor subfield format of STA field in the EHT NDPA frame may be 00000xxxx for the STAs operated on the secondary 80 MHz channel; the indication of Feedback Bitmap in Partial BW Infor subfield format of STA field in the EHT NDPA frame may be 0xxxx0000 for the STAs operated on the primary 80 MHz channel.

Alternatively, or additionally, when not all non-AP STAs that are notified can switch from the primary channel to the secondary channel, the AP STA can perform sounding procedure sequentially. As indicated in FIG. 23

Figure 23:
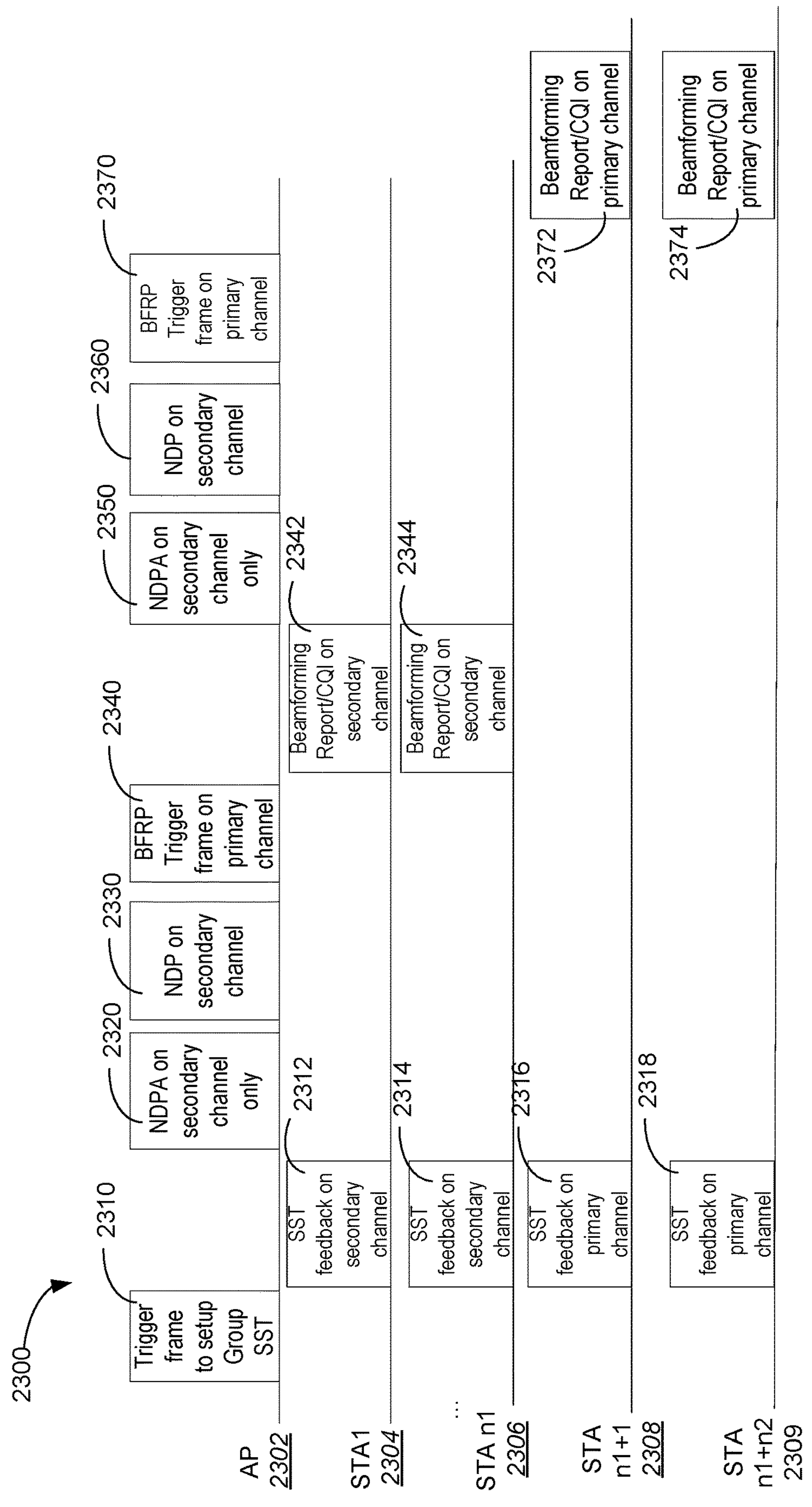
FIG. 23 is an exemplary illustration of a sequential sounding procedure in group based SST occurring on both primary and secondary channels.

FIG. 23 is an exemplary illustration of a sequential sounding procedure 2300 in group based SST occurring on both primary and secondary channels. An AP 2302 may send a trigger frame 2310, for example, to setup group SST. The AP 2302 may send the trigger frame 2310 to one or more STAs 2304, 2306, 2308, 2309. The one or more STAs 2304, 2306, 2308, 2309 may send SST feedback 2312, 2314, 2316, 2318 to the AP 2302 on the primary channel or a secondary channel. For example, the STAs 2304, 2306 may send SST feedback 2312, 2314 on the secondary channel and the STAs 2308, 2309 may send SST feedback 2316, 2318 on the primary channel.

In examples, the AP 2302 may send an NDPA 2320 to one or more of the STAs 2304, 2306, 2308, 2309 on the secondary channel only. In other examples, the AP 2302 may send an NDP 2330 to one or more of the STAs 2304, 2306, 2308, 2309 on the secondary channel and may send a BFRP trigger frame 2340 to one or more of the STAs 2304, 2306, 2308, 2309 on the primary channel. The AP 2302 may send the BFRP trigger frame 2340 to one or more of the STAs 2304, 2306, 2308, 2309 on the primary channel and/or the secondary channel. One or more of the STAs 2304, 2306 may send a beamforming report and/or CQI 2342, 2344 to the AP 2302 via the secondary channel. The AP 2302 may send another NDPA 2350 to one or more of the STAs 2304, 2306, 2308, 2309 on the secondary channel only. The AP 2302 may send an NDP 2360 to one or more of the STAs

2304, 2306, 2308, 2309 on the secondary channel and may send a BFRP trigger frame 2370 to one or more of the STAs 2304, 2306, 2308, 2309 on the primary channel. One or more of the STAs 2308, 2309 may send a beamforming report and/or CQI 2372, 2374 to the AP 2302 via the primary channel.

In examples described herein, for example, as depicted in FIGS. 21 to 23, STAs may transmit SST feedback/response frames on the secondary channel and/or may transmit SST feedback/response frames on the primary channel.

Figure 24:
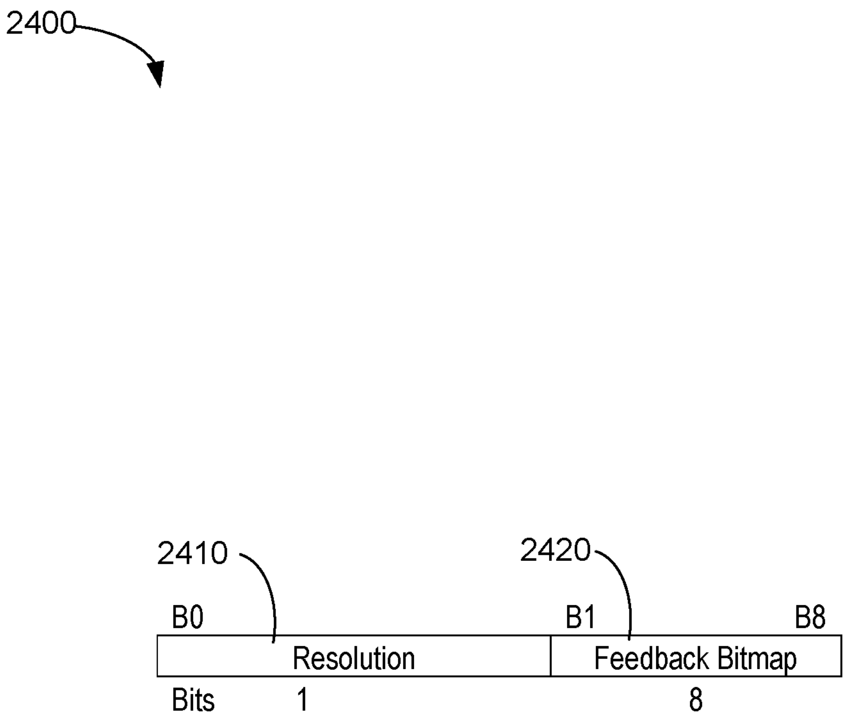
FIG. 24 illustrates a Partial bandwidth (BW) Info subfield format in a station (STA) Info field of an NDP Announcement frame.

FIG. 24 illustrates a Partial BW Info subfield 2400 in a STA Info field of an NDP Announcement frame. Settings for Partial BW in Group SST STAs are described herein. In examples, a Partial BW Info subfield 2400 for Group SST STAs which operate on the secondary channel may be defined as in FIG. 24. The resolution subfield 2410 in the Partial BW Info subfield 2400 may indicate a resolution bandwidth for each bit in a Feedback Bitmap subfield 2420. The Feedback Bitmap subfield(s) 2420 may indicate the request of each solution bandwidth from the lowest frequency to the highest frequency with B1 indicating the lowest resolution bandwidth. Each bit in the Feedback Bitmap subfield(s) 2420 may be set to 1 if the feedback is requested on the corresponding resolution bandwidth, for example, indicated in the resolution subfield 2410.

When the AP operating channel width is less than 320 MHZ, the SST STA operating channel bandwidth may be 80 MHz or less. As an example, when the AP operating bandwidth is 160 MHz, the primary channel bandwidth may be 80 MHz and the secondary channel bandwidth may be 80 MHz; when the AP operating bandwidth is 80 MHz, the primary channel bandwidth may be 40 MHz and the secondary channel bandwidth may be 40 MHz; when the AP operating bandwidth is 40 MHz, the primary channel bandwidth may be 20 MHz and the secondary channel bandwidth may be 20 MHz. B5-B8 of the Feedback Bitmap subfield 2420 indicate the secondary channel. The resolution bit B0 of the resolution subfield 2410 may be set to 0 to indicate a resolution of 20 MHz.

When the bandwidth of the EHT NDP Announcement frame is 20 MHZ, B5 of the Feedback Bitmap subfield 2420 may be set to 1 to indicate the request of feedback on the first 242-tone RU of the secondary channel. B1-B4 and B6-B8 of the Feedback Bitmap subfield 2420 may be reserved and set to 0.

When the bandwidth of the EHT NDP Announcement frame is 40 MHZ, B5 and B6 of the Feedback Bitmap subfield 2420 may indicate the request of feedback on each of the two 242-tone RUs from lower frequency to higher frequency of the secondary channel. The remaining bits (B1-B4, B7-B8) of the Feedback Bitmap subfield 2420 may be reserved and set to 0.

When the bandwidth of the EHT NDP Announcement frame is 80 MHZ, B5-B8 of the Feedback Bitmap subfield 2420 may indicate the request of feedback on each of the four 242-tone RUs from lower frequency to higher frequency of the secondary channel. B1-B4 of the Feedback Bitmap subfield 2420 may be reserved and set to 0. If B5-B8 of the Feedback Bitmap subfield 2420 are all set to 1, it may indicate the feedback request on the 996-tone RU of the secondary channel.

When the AP operating channel width is 320 MHz, the SST STA operating channel bandwidth may be 160 MHz or less. As an example, when the AP operating bandwidth is 320 MHZ, the primary channel bandwidth may be 160 MHz and the secondary channel bandwidth may be 160 MHz. In such case, the Resolution bit B0 of the resolution subfield 2410 may be set to 1 to indicate a resolution of 40 MHz. B1-B8 of the Feedback Bitmap subfield 2420 may indicate the request of feedback on each of the eight 484-tone RUs from lower frequency to higher frequency. If B5 and B6 of the Feedback Bitmap subfield 2420 are both set to 1, it may indicate the feedback request on the lowest 996-tone RU on the secondary channel; if B7 and B8 of the Feedback Bitmap subfield 2420 are both set to 1, it may indicate the feedback request on the secondary lowest 996-tone RU of the secondary channel. Alternatively, in the case where the AP operating channel width is 320 MHZ, if the BW of the sounding channel (NDPA and NDP bandwidth) is 160 MHz or 80 MHZ, the Resolution bit B0 of the resolution subfield 2410 in NDPA may be set as 0, which indicates the resolution of 20 MHz. For the SST STAs which operate on the secondary channel, B1-B8 bits of the Feedback Bitmap subfield 2420 indicate the RUs which are located on the secondary channel; for the SST group STAs which operate on the primary channel, B1-B8 bits of the Feedback Bitmap subfield 2420 indicate the RUs which are located on the primary channels.

FIG. 30 is a table illustrating an exemplary setting 3000 for BW and Partial BW Info subfields 3050 in the NDPA Announcement frame for SST STAs Operating on Secondary Channel or Primary Channel when the bandwidth of the NDPA frame is 160 MHz, AP operating channel width is 320 MHz and the operating channel width of the beamformee is 80 MHz or 160 MHz. As shown in FIG. 30, B1-B8 bits of the Partial BW Info Subfield values 3050 indicate RUs which are on primary or secondary channel with 160 MHz bandwidth. The operating channel width of the beamformee 3010, the BW of the NDP announcement frame 3020, the AP operating channel width 3030, and/or the feedback RU/MRT size 3040 may be indicated by the Partial BW info subfield values 3050 (e.g., bits B0-B8 of the Partial BW info subfield). Each bit value combination of the Partial BW info subfield values 3050 may correspond with a unique combination of the operating channel width of the beamformee 3010, the BW of the NDP announcement frame 3020, the AP operating channel width 3030, and/or the feedback RU/MRT size 3040. Based on the bit value combination in the Partial BW Info subfield 3050, the feedback RU/MRT size 3040 may change for each combination of operating channel width of the beamformee 3010, bandwidth of NDP announcement frame 3020, and AP operating bandwidth 3030.

FIG. 25 is a table illustrating bandwidth settings 2500 for BW and Partial BW Info subfields in the NDP Announcement frame for SST STAs Operating on Secondary Channels. The BW of the NDP announcement frame may be less than the BW of the AP's operating channel. The operating channel width of the beamformee 2510, the BW of the NDP announcement frame 2520, the AP operating channel width 2530, and/or the feedback RU/MRT size 2540 may be indicated by the Partial BW info subfield values 2550 (e.g., bits B0-B8 of the Partial BW info subfield). Each bit value combination of the Partial BW info subfield values 2550 may correspond with a unique combination of the operating channel width of the beamformee 2510, the BW of the NDP announcement frame 2520, the AP operating channel width 2530, and/or the feedback RU/MRT size 2540. Based on the bit value combination in the Partial BW Info subfield 2550, the feedback RU/MRT size 2540 may change for each combination of operating channel width of the beamformee 2510, bandwidth of NDP announcement frame 2520, and AP operating bandwidth 2530.

Dynamic puncture related TXVECTOR/RXVECTOR parameters may be provided. Dynamic puncture related TXVECTOR/RXVECTOR parameters may be used to carry inactive or active subchannel information for each transmission.

A parameter DYNAMIC_INACTIVE_SUBCHANNELS may be defined in TXVECTOR and RXVECTOR. The parameter DYNAMIC_INACTIVE_SUBCHANNELS may be passed between the MAC layer and the PHY layer regarding the information about subchannels which are dynamically punctured. Here the dynamic puncturing may refer to the cases in which one or more subchannels are punctured based on physical and/or virtual channel sensing (corresponding to CCA and/or NAV setting respectively) dynamically in addition to the subchannels indicated by parameter INACTIVE_SUBCHANNELS. Or the dynamic puncturing may refer to the cases in which one or more subchannels are punctured based on physical and/or virtual channel sensing (e.g., corresponding to CCA and/or NAV setting respectively) dynamically including the subchannels indicated by the parameter INACTIVE_SUBCHANNELS. In examples, a STA may indicate its capability to support dynamic puncturing. For example, a dynamic puncturing capability may be indicated in a capability element or field.

A STA that supports dynamic puncturing may not transmit on any 20 MHz subchannel that is dynamically punctured as indicated in the TXVECTOR parameter DYNAMIC_INACTIVE SUBCHANNELS. For example, a STA that supports dynamic puncturing may avoid transmitting on a 20 MHz subchannel that is indicated as dynamically punctured.

The indication of which subchannels are dynamically punctured may be conveyed from the MAC to the PHY through the TXVECTOR parameter DYNAMIC_INACTIVE SUBCHANNELS.

The indication of which subchannels are dynamically punctured may be conveyed from the PHY to the MAC through the RXVECTOR parameter DYNAMIC_INACTIVE SUBCHANNELS. A non-AP STA may receive a PPDU which may carry a Trigger frame EHT variant and may have an RXVECTOR parameter DYNAMIC_INACTIVE SUBCHANNELS set to a value to indicate the dynamically punctured subchannel(s) if the punctured subchannel information is carried in the PPDU or Trigger frame or SERVICE field of the PPDU or A-Control field in MAC header of a MAC frame. The non-AP STA transmitting an EHT TB PPDU in response to a Trigger frame may set the TXVECTOR parameter DYNAMIC_INACTIVE SUBCHANNELS to the value of RXVECTOR parameter DYNAMIC_INACTIVE SUBCHANNELS or the value carried in Trigger frame or other type of MAC frame or part of MAC frame (e.g., including A-Control field in MAC header).

Embodiments directed to A-PPDU Support in Trigger Frames are described herein. A-PPDU Support in Trigger Frames may enable a STA (e.g., an A-PPDU capable STA) to determine whether a transmission is an A-PPDU transmission and/or what type of PPDU to use to respond to the transmission.

FIG. 26 is a table 2600 illustrating possible A-PPDU cases with 80 MHz resolution. To support a fine A-PPDU resolution, such as 80 MHz, the Trigger frame may be modified. As shown in FIG. 26, introduced and described above, possible A-PPDU cases with 80 MHz resolution are listed. In FIG. 26, it may be assumed that the operating bandwidth of a BSS is 320 MHZ, and thus there may be 4 non-overlapping 80 MHz subchannels (or subblocks), for example, such as the primary 80 MHz subchannel (P80), the secondary 80 MHz subchannel (S80), the third 80 MHz subchannel (T80) and the fourth 80 MHz subchannel (F80) as shown in FIG. 26. With A-PPDU transmission, the PPDUs carried on each 80 MHz subchannel may be with different versions, such as HE variant and/or EHT variant. Existing EHT Triger frames may be enough to cover two cases shown in the first two columns, for example, HE PPDU on the primary and secondary 80 MHz subchannels (e.g., the primary 160 MHz subchannel) and EHT PPDU on the third and fourth 80 MHz subchannels (i.e., the secondary 160 MHz subchannel), and EHT PPDUs on the (e.g., all the) subchannels. Each column in the table 2600 represents an example A-PPDU transmission case. Each A-PPDU transmission case may include transmitting HE PPDU or EHT PPDU on the non-overlapping subchannels (e.g., P80, S80, T80, F80). Embodiments are provided herein to cover the A-PPDU cases shown in the third column (HE PPDU on the primary 80 MHz subchannel and EHT PPDUs on the rest of the subchannels). Some embodiments may possibly cover the A-PPDU cases shown in the third column and the fourth column of FIG. 26 (HE PPDU on the secondary 80 MHz subchannel and the EHT PPDU on the rest of the subchannels).

FIG. 27 is a table 2700 illustrating the use of B54 and B55 in a Common Info field to signal A-PPDU cases. In examples, some existing subfields in a Trigger frame may be repurposed to support the A-PPDU case that HE PPDU is transmitted on the primary 80 MHz subchannel. For example, the B54 in a Common Info field 2710 may be set to 0 and B55 in the Common Info field 2720 may be set to 1 to indicate HE PPDU on the primary 80 MHz subchannel and EHT PPDU on the rest of the subchannels. The combination of the bits of the B54 in Common Info field 2710 and B55 in Common Info field 2720 may indicate a subchannel 2730 and a TB PPDU type 2740. The HE/EHT P160 bit (B54 in Common Info field 2710) set to 1 may be used to indicate to an EHT STA that the solicited TB PPDU in the primary 160 MHz is a HE TB PPDU. The HE/EHT P160 bit (B54 in Common Info field 2710) set to 0 may be used to indicate to an EHT STA that the solicited TB PPDU in the primary 160 MHz may be a HE TB PPDU or an EHT TB PPDU depending on B55 in Common Info field 2720. The combination of B54 in Common Info field 2710 and B55 in Common Info field 2720 may be used to indicate if Special User Info field is included in the Trigger frame. [B54, B55] set to [1, 1] may indicate no Special User Info field is included in the Trigger frame, while [B54, B55] set to [1,0], [0.0], [0, 1] may indicate the presence of Special User Info field.

In examples, a HE STA may respond with an HE TB PPDU on its assigned RU in the primary 80 MHz or 160 MHz subchannel. An EHT STA may respond with an HE TB PPDU or EHT TB PPDU depending on the combination of B54, B55 and its RU allocation. When [B54, B55] are set to [1, 1], an EHT STA may respond with an HE TB PPDU in the Primary 160 MHz subchannel. When [B54, B55] are set to [1, 0], an EHT STA may respond with HE TB PPDU in the primary 160 MHz subchannel if its assigned RU is located in the primary 160 MHz subchannel and the EHT STA may respond with EHT TB PPDU in the secondary 160 MHz subchannel. When [B54, B55] are set to [0, 0], an EHT STA may respond with EHT TB PPDU in the entire bandwidth. When [B54, B55] are set to [0, 1], an EHT STA may respond with an HE TB PPDU in the primary 80 MHz subchannel if, for example, its allocated RU is in the primary 80 MHz subchannel, and with an EHT TB PPDU in the rest of the subchannels otherwise.

FIG. 28 is a table 2800 illustrating the use of B54 and B55 in the Common Info fields 2810, 2820 and another defined subfield that may be added to signal A-PPDU cases, such as the example shown in FIG. 28. In examples, a new subfield, e.g., an A-PPDU 80 subfield 2825, may be defined in the Common Info field and/or the Special User Info field or other field in a Trigger frame. The A-PPDU 80 subfield 2825 may indicate a solicited TB PPDU type. For example, the combination of the bits of the B54 in Common Info field 2810, B55 in Common Info field 2820, and the A-PPDU 80 subfield 2825 may indicate a subchannel 2830 and a TB PPDU type 2840.

In examples (e.g., example 1 as shown in FIG. 28), the A-PPDU 80 subfield 2825 set to 1 may indicate a 160 MHz subchannel or the primary 160 MHz subchannel may carry two or more type of TB PPDUs. The A-PPDU 80 subfield 2825 set to 0 may indicate a 160 MHz subchannel or the primary 160 MHz subchannel may carry one type of TB PPDU. As shown in FIG. 28, together with B54 and B55 in Common Info fields 2810, 2820, A-PPDU cases may be indicated. An HE STA may respond with an HT TB PPDU. When [B54, B55, A-PPDU 80] are set to [1,1,0], an EHT STA may respond with an HE TB PPDU. When [B54, B55, A-PPDU 80] are set to [1,0,0], an EHT STA may respond with an HE TB PPDU if its assigned RU is in the primary 160 MHz subchannel and may respond with an EHT TB PPDU if its assigned RU is in the secondary 160 MHz subchannel. When [B54, B55, A-PPDU 80] are set to [0,0,0], an EHT STA may respond with an EHT TB PPDU. When [B54, B55, A-PPDU 80] are set to [0,0,1], an EHT STA may respond with a HE TB PPDU if its assigned RU is in the primary 80 MHz subchannel and may respond with an EHT TB PPDU if its assigned RU is in the rest subchannels. [B54, B55, A-PPDU 80] set to [0,1,0/1] are reserved. The A-PPDU 80 subfield 2825 may be reserved if the operating bandwidth is smaller than 160 MHz.

In examples (e.g., as in example 2 shown in FIG. 29), the example shown in FIG. 28 may be extended to cover an A-PPDU case where the secondary 80 MHz is used for HE PPDU transmissions. Some or all of the bit combinations may be the same as shown in FIG. 28. However, when [B54, B55, A-PPDU 80] are set to [0,1,1], an EHT STA may respond with a HE TB PPDU if its assigned RU is in the secondary 80 MHz subchannel and may respond with an EHT TB PPDU if its assigned RU is in the rest subchannels. [B54, B55, A-PPDU 80] set to [0, 1,0] are reserved.

FIG. 29 is a table 2900 illustrating the use of B54 and B55 in the Common Info fields 2910, 2920 and another defined subfield to signal A-PPDU cases, such as in the example shown in FIG. 29. For example, the combination of the bits of the B54 in Common Info field 2910, B55 in Common Info field 2920, and the A-PPDU 80 subfield 2925 may indicate a subchannel 2930 and a TB PPDU type 2940.

Additional bits in U-SIG field may be used to signal a large number of EHT-SIG symbols. In examples, one or more bits of the Validate, Disregard, and/or reserved subfields/bits may be used to extend the Number of EHT-SIG Symbols field in U-SIG2 of the U-SIG field, for example such that a larger number of EHT-SIG symbols may be signaled. For example, using one or more bits of the Validate, Disregard, and/or reserved subfields may enable a greater number of EHT-SIG symbols to be signaled/indicated. In examples, extending the Number of EHT-SIG Symbols field to 6 bits may accommodate up to 64 EHT-SIG symbols. Some allocations which involve large number of users may be restricted to use certain values for the EHT-SIG MCS such that the maximum number of the EHT-SIG symbols required to signal this allocation may not exceed 32 EHT-SIG symbols. In examples, the number of data bits per content channel $N_{bpcc}$ required to signal $N_{upcc}$ users per content channel may be computed using Equation 1.

Equation 1

$$N_{bpcc} = N_{U-SIG\ Overflow} + N_{crc+tail} + a_{RU2}N_{crc+tail} + N_{bprua}N_{RU-Allocation} + \left(N_{bpuf} + \frac{N_{crc+tail}}{2}\right)N_{upcc} + \frac{N_{crc+tail}}{2}a_{odd}$$

Where the parameters of Equation 1 are defined in Table 2

TABLE 2

Definitions of Parameters Used in Equation 1

| Parameter | Definition |
|---|---|
| $N_{bpcc}$ | Number of data bits per content channel |
| $N_{U-SIG\ Overflow}$ | Number of U-SIG overflow data bits. |
| $N_{crc+tail}$ | Number of CRC and Tail bits |
| $a_{RU2}$ | Indicator to indicate if RU-Allocation-2 subfields exists for the considered bandwidth (e.g., for 160 and 320 MHz $a_{RU2} = 1$) |
| $N_{bprua}$ | Number of data bits per RU-Allocation subfield |
| $N_{bpuf}$ | Number of data bits per user field |
| $a_{odd}$ | Indicator to indicate if the number of users per content channel is odd (e.g., $a_{odd} = 1$ if $N_{upcc}$ is odd and $a_{odd} = 0$ otherwise) |

$N_{RU-Allocation}$ may depend on the bandwidth as indicated in Table 1, $a_{RU2}=0$ if there is no RU-Allocation-2 subfields (e.g., for bandwidths 20, 40 and 80 MHZ), and $a_{RU2}=1$ if there is RU-Allocation-2 subfields (e.g., for bandwidths 160 and 320). The number of EHT-SIG symbols to signal the $N_{bpcc}$ data bits may be calculated as:

$$N_{EHT-SIG\ Symbols} = \left\lceil \frac{N_{bpcc}}{N_{DBPS}} \right\rceil$$

Where $N_{DBPS}$ is the number of data bits per EHT-SIG symbol which depends on the EHT-SIG MCS as indicated in FIG. 13. Accordingly, the EHT-SIG MCS may be selected from the table in FIG. 13 such that the number of EHT-SIG symbols $N_{EHT-SIG}$ does not exceed 32. For example, an SST may include a SIG field (e.g., the EHT-SIG field) with a number of data bits that is associated with a bandwidth size associated with the SST (e.g., as shown in Table 1).

In examples, the allocations that are allowed on some bandwidths may be restricted such that the cases where a large number of users are required to be signaled in the EHT-SIG may be disallowed. For example, when the bandwidth is 320 MHz, the allocations with a number of users per content channel that would exceed a certain threshold may not be allowed for different EHT-SIG MCSs. Table 3 shows an example scenario of the maximum number of allowed users for different EHT-SIG MCSs in 320 MHz bandwidth.

TABLE 3

Exemplary Maximum Allowed Number of Users in 320 MHz Bandwidth

| Value of the EHT-SIG MCS field | $N_{DBPS}$ | $N_{bpcc}^{max}$ (assuming 32 EHT-SIG Symbols) | $N_{upcc}^{max} = \left\lfloor \frac{N_{bpcc}^{max} - 109}{27} \right\rfloor$ |
|---|---|---|---|
| 0 | 26 | 832 | 26 |
| 1 | 52 | 1664 | 57 |

TABLE 3-continued

Exemplary Maximum Allowed Number of Users in 320 MHz Bandwidth

| Value of the EHT-SIG MCS field | $N_{DBPS}$ | $N_{bpcc}^{max}$ (assuming 32 EHT-SIG Symbols) | $N_{upcc}^{max} = \left\lfloor \frac{N_{bpcc}^{max} - 109}{27} \right\rfloor$ |
|---|---|---|---|
| 2 | 104 | 3328 | 119 |
| 3 | 13 | 416 | 11 |

The computations in Table 3 may assume the following values of the parameters in Table 4 for Equation 1.

TABLE 4

Values Used in Computations of the Example Scenario in Table 3

| Parameter | Value (bits) |
|---|---|
| $N_{U\text{-}SIG\ Overflow}$ | 17 |
| $N_{crc+tail}$ | 10 |
| $a_{RU2}$ | 1 |
| $N_{bprua}$ | 9 |
| $N_{bpuf}$ | 22 |
| $N_{RU\text{-}Allocation}$ | 8 |

Although features and elements are described above in particular combinations, one of ordinary skill in the art will appreciate that each feature or element can be used alone or in any combination with the other features and elements. In addition, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:

a transceiver; and a processor configured to:

receive, via the transceiver, a trigger frame from an access point (AP), the trigger frame indicating information associated with a range of association identifiers (AIDs) and subchannel information, wherein the subchannel information identifies one or more secondary subchannels configured for a transmission to a plurality of STAs and comprises an indication of assignment of the one or more secondary subchannels to the range of AIDs;

determine that an AID of the STA is within the range of AIDs indicted in the information in the trigger frame;

send, via the transceiver, feedback to the AP that indicates that the STA will monitor at least one of the one or more secondary subchannels;

receive, via the transceiver from the AP, the transmission for the plurality of STAs on the one or more secondary subchannels; and send, via the transceiver, an acknowledgment (ACK) to the AP on the one or more secondary subchannels in response to receipt of the transmission to the plurality of STAs.

2. The STA of claim 1, wherein the transmission for the plurality of STAs is a group-based transmission or a multi-user transmission.

3. The STA of claim 2, wherein the transmission for the plurality of STAs is a group-based transmission, and wherein the processor is configured to send the feedback in a group-based transmission feedback frame.

4. The STA of claim 2, wherein the transmission for the plurality of STAs is a group-based transmission, wherein the subchannel information further comprises one or more of a periodicity associated with the group-based transmission, a starting time associated with the group-based transmission, a period associated with the group-based transmission, or an group-based transmission channel, and wherein the group-based transmission channel is via the one or more secondary subchannels.

5. The STA of claim 1, wherein the transmission for the plurality of STAs is a group-based transmission, wherein the group-based transmission comprises a signal field with a number of data bits that is associated with a bandwidth size associated with the group-based transmission.

6. The STA of claim 1, wherein the processor is configured to:

indicate an aggregated physical layer protocol data unit (A-PPDU) capability, wherein the range of AIDs comprises contiguous AIDs with the A-PPDU capability.

7. The STA of claim 1, wherein the one or more secondary subchannels comprises a plurality of secondary subchannels, and wherein the processor is configured to send the feedback via the plurality of secondary subchannels.

8. The STA of claim 1, wherein the processor is configured to send the feedback via one or more primary subchannels.

9. The STA of claim 1, wherein the processor is configured to send the feedback using one or more resource units indicated in the trigger frame.

10. The STA of claim 1, wherein the range of AIDs is associated with a ratio of aggregated physical layer protocol data unit (A-PPDU) capable STAs in a basic service set (BSS) that comprises the STA.

11. A method performed by a station (STA) comprising:

receiving a trigger frame from an access point (AP), the trigger frame indicating information associated with a range of association identifiers (AIDs) and subchannel information, wherein the subchannel information identifies one or more secondary subchannels configured for a transmission to a plurality of STAs and comprises an indication of assignment of the one or more secondary subchannels to the range of AIDs;

determining that an AID of the STA is within the range of AIDs indicted in the information in the trigger frame;

sending feedback to the AP that indicates that the STA will monitor at least one of the one or more secondary subchannels;

receiving, from the AP, the transmission for the plurality of STAs on the one or more secondary subchannels; and sending an acknowledgment (ACK) to the AP on the one or more secondary subchannels in response to receipt the transmission to the plurality of STAs.

12. The method of claim 11, wherein the transmission for the plurality of STAs is a group-based transmission or a multi-user transmission.

13. The method of claim 12, wherein the transmission for the plurality of STAs is a group-based transmission, and wherein the feedback is sent in a group-based transmission feedback frame.

14. The method of claim 12, wherein the transmission for the plurality of STAs is a group-based transmission, wherein the subchannel information further comprises one or more of a periodicity associated with the group-based transmission, a starting time associated with the group-based transmission, a period associated with the group-based transmission, or an group-based transmission channel, and wherein the group-based transmission channel is via the one or more secondary subchannels.

15. The method of claim 11, wherein the transmission for the plurality of STAs is a group-based transmission, wherein the group-based transmission comprises a signal field with a number of data bits that is associated with a bandwidth size associated with the group-based transmission.

16. The method of claim 11, further comprising:

indicating an aggregated physical layer protocol data unit (A-PPDU) capability, wherein the range of AIDs comprise contiguous AIDs with the A-PPDU capability.

17. The method of claim 11, wherein the one or more secondary subchannels comprises a plurality of secondary subchannels, and wherein the feedback is sent via the plurality of secondary subchannels.

18. The method of claim 11, wherein the feedback is sent via one or more primary subchannels.

19. The method of claim 11, wherein the feedback is sent using one or more resource units indicated in the trigger frame.

20. The method of claim 11, wherein the range of AIDs is associated with a ratio of aggregated physical layer protocol data unit (A-PPDU) capable STAs in a basic service set (BSS) that comprises the STA.

* * * * *